US008208163B2

(12) United States Patent
Ohira

(10) Patent No.: US 8,208,163 B2
(45) Date of Patent: Jun. 26, 2012

(54) IMAGE PROCESSING APPARATUS, IMAGE FORMING APPARATUS, IMAGE PROCESSING SYSTEM, AND IMAGE PROCESSING METHOD

(75) Inventor: Masakazu Ohira, Shiki-Gun Nara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 943 days.

(21) Appl. No.: 12/284,946

(22) Filed: Sep. 26, 2008

(65) Prior Publication Data

US 2009/0086232 A1 Apr. 2, 2009

(30) Foreign Application Priority Data

Sep. 27, 2007 (JP) ................................. 2007-252695

(51) Int. Cl.
  *G06F 3/12* (2006.01)
  *G06F 15/00* (2006.01)
  *G06K 9/68* (2006.01)
  *G06K 1/00* (2006.01)

(52) U.S. Cl. ....... 358/1.15; 358/1.13; 358/1.9; 382/218; 382/219

(58) Field of Classification Search ........................ None
See application file for complete search history.

(56) References Cited

U.S. PATENT DOCUMENTS

| 5,465,353 | A | 11/1995 | Hull et al. | |
| 7,903,282 | B2* | 3/2011 | Furukawa et al. | 358/1.9 |
| 2002/0131080 | A1 | 9/2002 | Enomoto | |
| 2006/0232795 | A1* | 10/2006 | Tsuboi et al. | 358/1.2 |
| 2007/0071317 | A1* | 3/2007 | Kubo et al. | 382/167 |
| 2007/0253623 | A1* | 11/2007 | Ohira et al. | 382/218 |
| 2008/0177764 | A1 | 7/2008 | Kise et al. | |

FOREIGN PATENT DOCUMENTS

| JP | 10-171839 A | 6/1998 |
| JP | 11-46299 | 2/1999 |
| JP | 2002-277984 | 9/2002 |
| JP | 2003-187215 | 7/2003 |
| JP | 2003-233279 | 8/2003 |
| JP | 2004-54751 | 2/2004 |
| JP | 2004-350212 | 12/2004 |
| JP | 2006-174183 | 6/2006 |
| JP | 2006-261907 | 9/2006 |

OTHER PUBLICATIONS

U.S. Appl. No. 12/221,044, filed Jul. 30, 2008.

* cited by examiner

*Primary Examiner* — King Poon
*Assistant Examiner* — Ming Hon
(74) *Attorney, Agent, or Firm* — Edwards Wildman Palmer LLP; David G. Conlin; Edmund Koundakjian

(57) ABSTRACT

In a server are stored (i) identification information of a reference image and (ii) a common process rule applied to input image data determined as being similar to the reference image. In a card is stored a merged process rule obtained by merging the common process rule with an individual process rule. Further, when a version of the merged process information is identical to a version of the common process information, a process based on the merged process information corresponding to the reference image determined as being similar to the input image data is carried out, and when these versions are not identical, the process based on the merged process information is not carried out. Consequently, it is possible to reduce the load of the user concerning operation for setting the content of the process for the input image data.

11 Claims, 19 Drawing Sheets

FIG. 5

| INDEX INDICATIVE OF DOCUMENT | PROCESS | |
|---|---|---|
| ID1 | COPY | PROHIBITED |
| ID2 | ELECTRONIC DISTRIBUTION | MAIL ADDRESS 1 |
| ID3 | FILING | PATH 1 TO FILING FOLDER |
| ID4 | COPY | PROHIBITED |
| ID5 | FILING | SET |
| ⋮ | ⋮ | |
| IDn-1 | ELECTRONIC DISTRIBUTION | MAIL ADDRESS n-1 |

FIG. 6

| INDEX INDICATIVE OF DOCUMENT | PROCESS | |
|---|---|---|
| ID1 | COPY | PROHIBITED |
| ID2 | ELECTRONIC DISTRIBUTION | MAIL ADDRESS 1 |
| ID3 | FILING | PATH 1 TO FILING FOLDER |
| ID4 | COPY | PROHIBITED |
| ID5 | FILING | PATH 2 TO FILING FOLDER |
| ⋮ | ⋮ | |
| IDn-1 | ELECTRONIC DISTRIBUTION | MAIL ADDRESS n-1 |
| IDn | COPY | PROHIBITED |

FIG. 7 (a)

IP ADDRESS ¥ aaa ¥ bbb ¥ ccc ¥ ddd ¥ eee
⎵
IPk

FIG. 7 (b)

| IP1 | 10.1.1.1 |
|---|---|
| IP2 | 10.1.1.2 |
| IP3 | 10.1.1.3 |
| IP4 | 10.1.1.4 |
| ⋮ | ⋮ |

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FIG. 17 (a)

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 17 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

IMAGE PROCESSING APPARATUS, IMAGE FORMING APPARATUS, IMAGE PROCESSING SYSTEM, AND IMAGE PROCESSING METHOD

This Nonprovisional application claims priority under U.S.C. §119(a) on Patent Application No. 252695/2007 filed in Japan on Sep. 27, 2007, the entire contents of which are hereby incorporated by reference.

FIELD OF THE INVENTION

The present invention relates to an image processing apparatus, an image processing system, and an image processing method, each of which allows similarity determination between input image data and pre-registered image data and allows a control of a process of the input image data according to the result of the similarity determination.

BACKGROUND OF THE INVENTION

There has been used a technique for comparing (i) input image data obtained by reading a document image with a scanner and (ii) a reference image (pre-registered image), so as to determine similarity between the input image data and the reference image, and preventing a process (such as copy etc.) for the input image data in case where the input image data is determined as being similar to the reference image.

Examples of a method for determining similarity include: a method in which a keyword is extracted from an image with OCR (Optical Character Reader) so as to carry out matching with the keyword; a method in which a target image is limited to an image with ruled lines and matching is carried out based on features of the ruled lines; and a method in which similarity is determined based on distribution of color components of input image data and a reference image.

Furthermore, Patent Document 1 (Japanese Unexamined Patent Publication: Tokukaihei 7-282088 (published on Oct. 27, 1995) discloses a technique in which a descriptor that is invariable to distortion caused by digitalization of an input document or to a difference between the input document and a document database is generated based on feature points of the input document, and matching between the input document and a document in the document database is performed using the descriptor and a descriptor database which stores descriptors and which indicates a list of documents including features from which descriptors are extracted. In the technique, when the descriptor database is scanned, votes for individual documents in the document database are accumulated, and a document with the largest number of votes or a document whose number of votes is over a certain threshold value is considered as a matching document.

Furthermore, an example of a technique for controlling a process for input image data in accordance with the result of similarity determination is as follows: in order to prevent forgery of a bill or securities by a color image forming apparatus, it is determined whether input image data is identical to image data such as a bill or securities (reference image) or not based on a pattern extracted from the input image data, and when the input image data is identical to the image data of the reference image, a specific pattern is given to an output image so as to specify the image forming apparatus that carries out copying, a copied image is blacked out, or copying is prevented.

However, according to the aforementioned conventional techniques, in case where the input image data is determined as being identical to image data of the reference image, processes carried out with respect to the input image data can be restricted (there are performed processes, such as addition of a specific pattern, restriction of processing by blacking out a copy image, and prohibiting of a copying operation), but a process for the input image data is set to a certain process (addition of a specific pattern, restriction of processing by blacking out a copy image, and prohibiting of a copying operation) in accordance with whether the input image data is similar to image data of the reference image. This raises such problem that the image can be less freely processed and it is troublesome to use functions thereof.

For example, in offices of recent companies and the like, it is often that there are provided multi-function printers each having a copying function, a facsimile function, a filing function, an electronic distribution function, and the like. Further, it is often that each of these multi-function printers is shared by a plurality of users or a plurality of groups. In such cases, it is often required to carry out a process (copying, facsimile transmission, filing, electronic distribution, and the like) with respect to a document (input image data) in accordance with a predetermined rule having been determined for each user or each group. Further, it may be required to carry out a predetermined process with respect to the document in accordance with a type of the document or a similar condition.

However, the conventional technique takes into consideration only such arrangement that the process for the document is prohibited or restricted in case where it is determined that the document is similar to the reference image. As a result, what process should be carried out cannot be set in accordance with a user, a group of the user, a type of the document, and the like, and the matching result. Thus, what process should be carried out has to be set by the user in detail every time a process such as copying, facsimile transmission, filing, electronic distribution, or the like with respect to the document is carried out. This is so troublesome.

SUMMARY OF THE INVENTION

In view of the foregoing problems, the present invention was made, and an object of the present invention is to provide an image processing device, determining similarity between input image data and a reference image, which image processing device reduces load of the user in setting what process is to be carried out with respect to the input image data.

In order to solve the foregoing problems, an image processing device of the present invention comprises: a features extracting section for extracting features of input image data; a reference features obtaining section for obtaining, from a communicably connected server or a reference storage section of the image processing apparatus, reference image information in which identification information of a reference image and features of the reference image correspond to each other; a similarity determination section for comparing the features of the input image data with the features of the reference image so as to determine whether the input image data is similar to the reference image or not; a control section for controlling a process for the input image data in accordance with a determination result given by the similarity determination section; and an external connection section for allowing information to be transmitted to and from an external storage device, said image processing apparatus further comprising a common process information obtaining section for obtaining, from the server or a common process information storage section of the image processing apparatus, (i) common process information in which a common process rule indicative of a process commonly applied to input image data determined as being similar to the reference image regardless of a user or attribute of the user corresponds to the identification information of the reference image and (ii) version information of the common process information, wherein the control section obtains, from the external storage device, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

Note that, an example of the process for the input image data is any one of copying, printing, electronic distribution, facsimile transmission, filing, image correction, enlargement/reduction, rotation, trimming, synthesis with other image, data format conversion, and encryption, or a combination of two or more these processes. Further, the input data obtaining section may be such that a document is read with a scanner so as to obtain input image data, or may be such that software is used to input necessary information into an electronic data format thereby obtaining resultant input image data, or may be such that input image data directly inputted as electric data is obtained, or may be such that input image data transmitted from other apparatus communicably connected to the image processing apparatus is obtained, for example. Further, the external storage device may be provided with it detachable from the image processing apparatus or may be communicably connected to the image processing apparatus in a wired or wireless manner.

According to the arrangement, the image processing apparatus obtains, from the server or the storage section (the reference storage section and the common process information storage section) of the image processing apparatus, (A) the reference image information in which identification information of a reference image and features of the reference image correspond to each other, (B) the common process information in which a common process rule indicative of a process commonly applied to input image data determined as being similar to the reference image regardless of a user or attribute of the user corresponds to the identification information of the reference image, and (C) the version information of the common process information. Further, the image processing apparatus obtains, from the external storage device, (1) the merged process information in which the identification information of the reference image corresponds to a merged process rule obtained by merging the common process rule with an individual process rule which is indicative of a process applied to the input image data determined as being similar to the reference image and which is set for each user or for attribute of the user and (2) the version information of the merged process information. Further, the control section of the image processing apparatus controls the process for the input image data so as to carry out the process based on the merged process rule corresponding to the reference image determined as being similar to the input image data by the similarity determination section only in case where the version information of the merged process information is identical to version information of the common process information or in case where the version information of the merged process information is latter than a predetermined version.

Thus, the process based on the merged process rule corresponding to the reference image determined as being similar to the input image data by the similarity determination section is carried out only in case where the version information of the merged process information is identical to version information of the common process information or in case where the version information of the merged process information is latter than a predetermined version, so that the user does not have to input every process carried out with respect to the input image data similar to the reference image, thereby reducing load of the user in setting a process for the input image data. Further, it is possible to suppress occurrence of such problem that: a process for the input image data is more restricted than necessary in case where a less important change is made with respect to the common process rule or a similar case, so that the process cannot be carried out smoothly. Further, the process based on the merged process rule is not carried out in case where the version information of the merged process information is not identical to the version information of the common process information and the version information of the merged process information is former than the predetermined version information, so that it is possible to easily cause all the user using the image processing apparatus to carry out the process exclusively based on the common process rule whose version is latter than the predetermined version.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5 is an explanatory drawing illustrating an example of a common process table used in an image processing system in accordance with an embodiment of the present invention.

FIG. 6 is an explanatory drawing illustrating an example of a merged process table used in an image processing system in accordance with an embodiment of the present invention.

FIG. 7($a$) and FIG. 7($b$) are explanatory drawings each of which illustrates an example of how to refer to an electronic distribution destination address used in an image processing system in accordance with an embodiment of the present invention.

FIG. 17(a) and FIG. 17(b) are explanatory drawings each of which illustrates an example of ID indicative of a hash value and input image data concerning each of feature points registered in a hash table by the image processing apparatus in FIG. 3

DESCRIPTION OF THE EMBODIMENTS

Embodiment 1

An embodiment of the present invention is explained below.

(1-1. Arrangement of Image Processing System 100)

Figure 2:
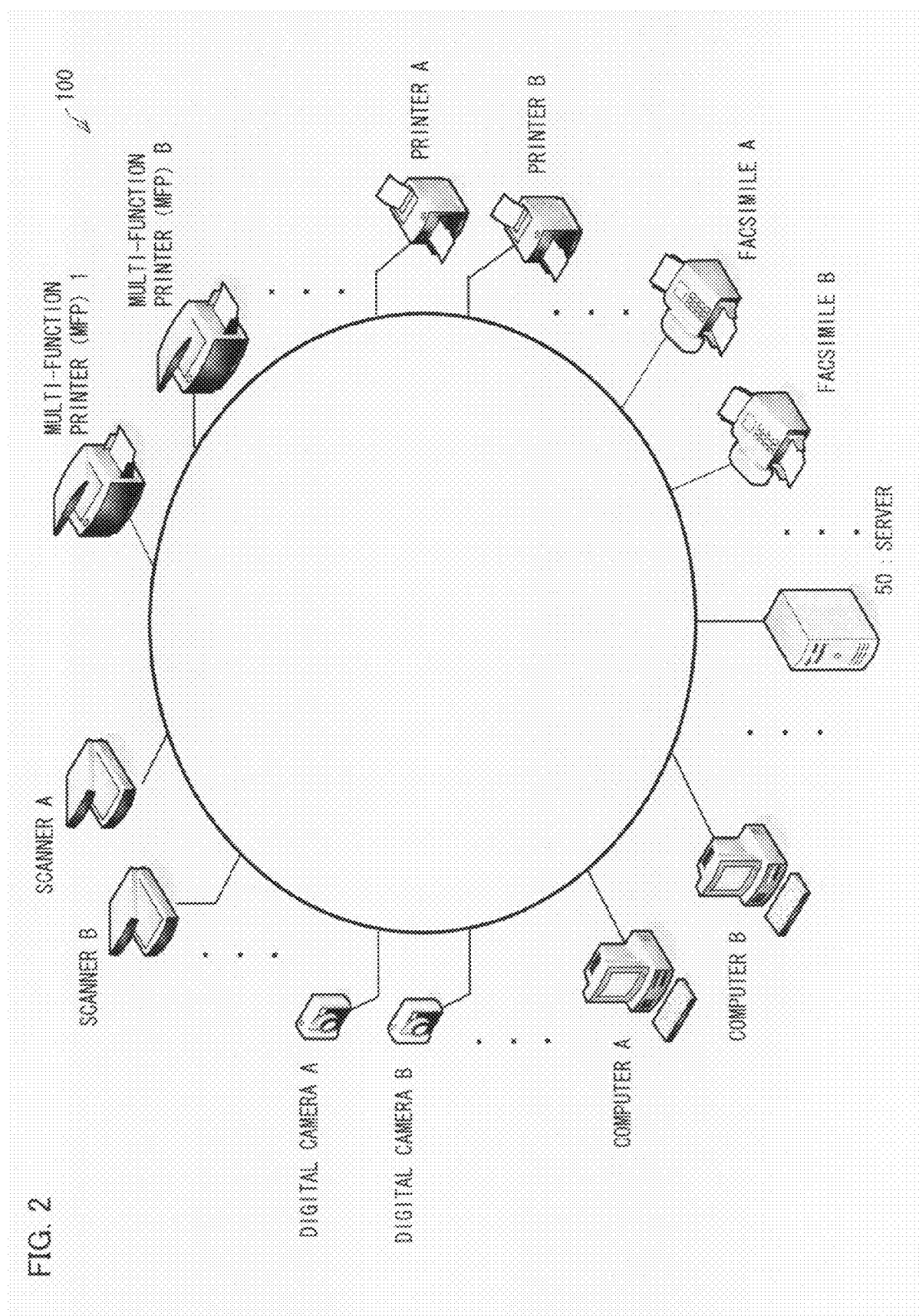
FIG. 2 is an explanatory drawing schematically illustrating a configuration of an image processing system in accordance with an embodiment of the present invention.

FIG. 2 is a schematic illustrating an arrangement of an image processing system 100 according to the present embodiment.

As illustrated in FIG. 2, the image processing system 100 includes a server 50 and terminal apparatuses (image processing apparatuses) such as: multi-function printers (MFPs) A, B, . . . ; facsimiles A, B, . . . ; computers A, B, . . . ; digital cameras A, B, . . . ; and scanners A, B, . . . , all of which are communicably connected to the server 50 via a network.

Note that, the configuration of the image processing system 100 is not limited to this. For example, the image processing system 100 may include the server 50 and at least one of a multi-function printer, a printer, a facsimile, a computer, a digital camera, and a scanner. Further, the image processing system 100 may include terminal apparatuses other than the aforementioned apparatuses. Each of the terminal apparatuses includes a below-described document matching process section 13 and a card reader 91, so that each terminal apparatus can serve as the image processing apparatus of the present invention. The present embodiment describes mainly a case where a multi-function printer (digital color multi-function printer) 1 is provided as the image processing apparatus.

Figure 3:
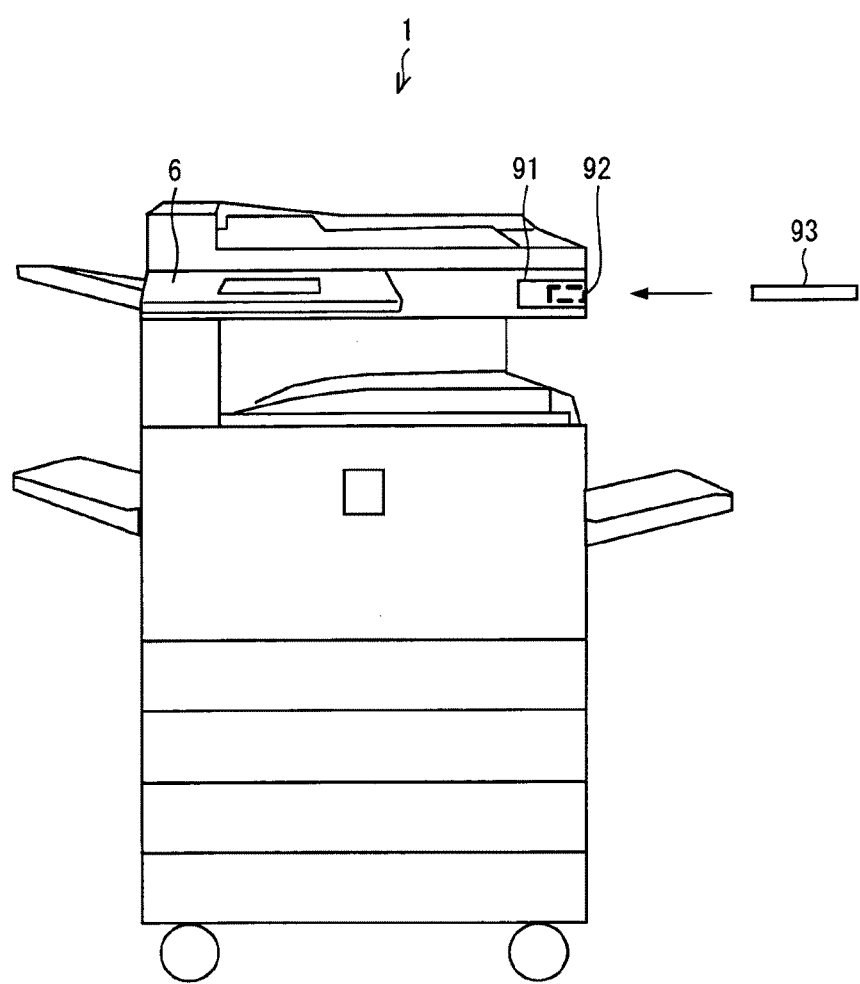
FIG. 3 is a perspective view illustrating an example of an image processing apparatus included in an image processing system in accordance with an embodiment of the present invention.
Figure 4:
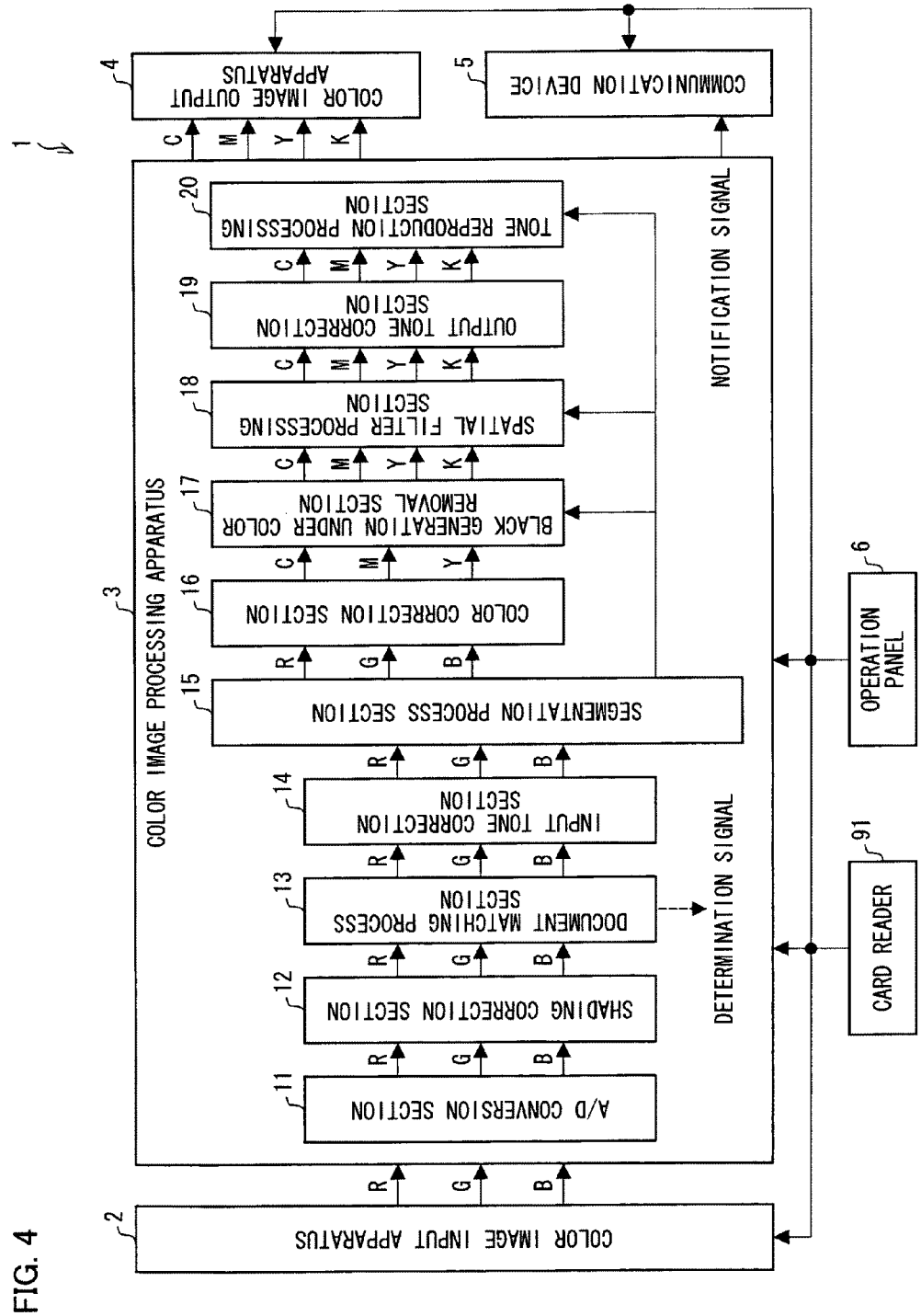
FIG. 4 is a block diagram schematically illustrating a configuration of the image processing apparatus in FIG. 3.

FIG. 3 is a perspective view of a digital color multi-function printer 1 according to the present embodiment. FIG. 4 is a block diagram schematically illustrating an arrangement of the digital color multi-function printer 1. The digital color multi-function printer 1 has a copying function, a printing function, a facsimile transmission function, a scanning function, a scan-to-E-mail function, and the like.

As illustrated in FIG. 3 and FIG. 4, the digital color multi-function printer 1 includes a color image input apparatus 2, a color image processing apparatus 3, a color image output apparatus 4, a communication device 5, an operation panel 6, a card reader 91, and the like.

The color image input apparatus (image scanning section) 2 is, for example, composed of a scanner (not shown) including a CCD (Charge Coupled Device) for converting optical information into an electric signal. In the color image input apparatus 2, the CCD reads an optical image reflected from an original document as RGB (R:Red, G:Green, B:Blue) analog signals and supplies the RGB analog signals to the color image processing apparatus 3.

The color image processing apparatus 3 includes an A/D conversion section 11, a shading correction section 12, a document matching process section 13, an input tone correction section 14, a segmentation process section 15, a color correction section 16, a black generation under color removal section 17, a spatial filter process section 18, an output tone correction section 19, and a tone reproduction process section 20. The analog signals read by the color image input apparatus 2 are transmitted to the A/D conversion section 11, the shading correction section 12, the document matching process section 13, the input tone correction section 14, the segmentation process section 15, the color correction section 16, the black generation under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) conversion section 11 converts the RGB analog signals into RGB digital signals.

The shading correction section 12 removes various distortions produced in illumination system, image focusing system, and image sensing system of the color image input apparatus 2 from the RGB digital signals transmitted from the A/D conversion section 11. Moreover, the shading correction section 12 adjusts color balance of the RGB digital signals and converts each signal into a density (pixel value) signal which can be processed easily by an image processing system used in the color image processing apparatus 3.

The document matching process section 13 extracts features from the input image data. Further, the document matching process section 13 carries out a similarity determination process (a process for determining whether there is any similarity or not; matching process) so as to determine similarity between the input image data and the reference image. Further, in case where it is determined that there is similarity, the document matching process section 13 processes the input image data (or restricts a processes for the input image data) in accordance with a process rule stored with it corresponding to the reference image. For example, the document matching process section 13 prohibits processes such as copying, electronic distribution, facsimile transmission, filing, and the like, or partially blacks out an image corresponding to the input image data and outputs the blacked out image, or adds, to the image corresponding to the input image data, information for specifying an output apparatus or information indicating that the image is a copy, and outputs the resultant image, or files the input image data into a predetermined folder, or transmits the input image data to a predetermined mail address. Further, the document matching process section 13 carries out a storage process for storing an ID (index) of the input image data, features of the input image data, and a process rule for the input image data, with them corresponding to one another. Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals, whose various distortions have been removed by the shading correction section, and adjusts image quality such as contrast.

The segmentation process section 15 segments each pixel of an input image into either one of a text region, a halftone dot region, or a photograph (continuous tone) region, according to the RGB signals. On the basis of a result of the segmentation, the segmentation process section 15 outputs a segmentation class signal, indicating which region a pixel of the input image belongs to, to the color correction section 16, the black generation under color removal section 17, the spatial filter process section 18, and the tone reproduction process section 20. The segmentation process section 15 also outputs the input signal as received from the input tone correction section 14 to the subsequent color correction section 16.

The color correction section 16 removes color impurity on the basis of spectral characteristics of CMY (C:Cyan, M:Magenta, and Y:Yellow) color materials including an unnecessarily absorption component, in order to realize a faithful color reproduction.

The black generation under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter process on the basis of a segmentation class signal, with respect to the image data which is received in the form of the CMYK signals from the black generation under color removal section 17. In the spatial filter process, the spatial filter process section 18 corrects a spatial frequency characteristic, so as to prevent a blur or granularity deterioration in an output image. The tone reproduction process section 20, as with the spatial filter process section 18, performs predetermined processing with respect to the image data in the form of the CMYK signals, on the basis of the segmentation class signal.

For example, in the region segmented into a text region by the segmentation process section 15, the spatial filter process section 18 strongly emphasizes a high frequency component in edge enhancement process of the spatial filter process, in order to improve reproducibility of black texts (achromatic texts) or color texts (chromatic texts) especially. Concurrently, the tone reproduction process section 20 selects either binary processing or multi-level dithering processing on a high-resolution screen suitable for reproducing the high frequency component.

In the region segmented into a halftone dot region by the segmentation process section 15, the spatial filter process section 18 performs a low pass filter process for removing an input halftone dot component. The output tone correction section 19 performs the output tone correction process in which a signal such as the density signal is converted into a halftone dot area rate that is characteristics of a color image output apparatus 4. Subsequently, the tone reproduction process section 20 performs the tone reproduction process (halftone generation) so that, ultimately, an image is segmented into pixels and each tone of the pixels can be reproduced. In the region segmented into a photograph region by the segmentation process section 15, the binary process or the multi-level dithering process is performed on a screen suitable for tone reproduction.

The image data which has been subjected to each of the processes mentioned above is temporarily stored in a storage device (not shown). The image data is read from the storage device at a predetermined timing and supplied to the color image output apparatus 4.

The color image output apparatus 4 forms an image based on the image data onto a recording medium such as paper. An example of the color image output apparatus 4 is a color image output apparatus which uses an electrophotographic method or an ink-jet method. However, the image output apparatus 4 is not specifically limited to this.

The communication device 5 is composed of a modem or a network card for example. The communication device 5 communicates with other device connected to a network (e.g., the server 50, a personal computer, other digital color multi-function printer, a facsimile device, and the like) via a network card, a LAN cable, and the like.

Note that, in case of transmitting image data, the communication device 5 reads out, from a memory, the image data compressed (encoded) in a predetermined format (image data scanned by a scanner) and carries out necessary process such as conversion of the compression format so as to sequentially transmit the image data via a communication line.

Further, in case of receiving image data, the communication device 5 carries out a communication procedure and receives the transmitted image data so as to input the image data to the color image processing apparatus 3. The received image data is subjected to predetermined processing such as decoding process, rotation processing, resolution conversion process, output tone correction, and tone reproduction processing by the color image processing apparatus 3, and the image data processed is outputted by the color image output apparatus 4. Note that, it may be so arranged that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction of a main control section (not shown) of the digital color multi-function printer 1 and transmits information, inputted by the user with use of the setting buttons, to the main control section. The user can input, from the operation panel 6, a processing request (e.g., a processing mode (copying, printing, electronic distribution, facsimile transmission, filing, image data correction/edition, and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered from the operation panel 6, the main control section controls each operation of each section of the digital color multi-function printer 1.

As illustrated in FIG. 3, the card reader 91 includes a card slot 92. Further, the card reader 91 reads out information stored in a card (external storage device) 93 inserted into the card slot 92 and transmits information to and writes the information onto the card 93. The card 93 will be detailed later. Examples of the card 93 include an IC card, a memory card, an optical card, and the like. Further, the present embodiment describes mainly the case of using the card 93 as the external storage device, but the external storage device is not necessarily limited to the card-type storage device. For example, it is possible to use an external storage device such as: magnetic tape and cassette tape; disks including magnetic disks, such as floppy disks (registered trademark) and hard disk, and optical disks, such as CD-ROMs, magnetic optical disks (MOs), mini disks (MDs), digital video disks (DVDs), and CD-Rs; cards, such as IC card (including memory cards) and optical cards; and semiconductor memories, such as mask ROMs, EPROMs, EEPROMs, and flash ROMs. Further, arrangements of the card reader 91 and the card slot 92 are suitably varied so that information is written onto and read out from an external storage device in accordance with a type of the external storage device so as to appropriately write onto and read out from the external storage device. Further, it may be so arranged that a mobile terminal device such as a mobile phone, PDF, and the like is communicably connected to the digital color multi-function printer 1 in a wired or wireless manner and a memory provided on the terminal device is used as the external storage device.

Further, such an external storage device is not limited to the mobile external storage device. For example, an external device, such as a personal computer, a server, and the like, communicably connected to the digital color multi-function printer 1 via a network may be used as the external storage device. In this case, it may be so arranged that the card reader 91 is omitted and information is transmitted between the digital color multi-function printer 1 and the external storage device via the communication device 5.

(1-2. Arrangement of Document Matching Process Section 13)

Next explained is an arrangement of the document matching process section 13. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value by combining the calculated invariants, and votes for a reference image corresponding to the hash value, thereby retrieving a reference image similar to the input image data and carrying out a similarity determination process (whether there is any similarity or not) with respect to the reference image.

Figure 1:
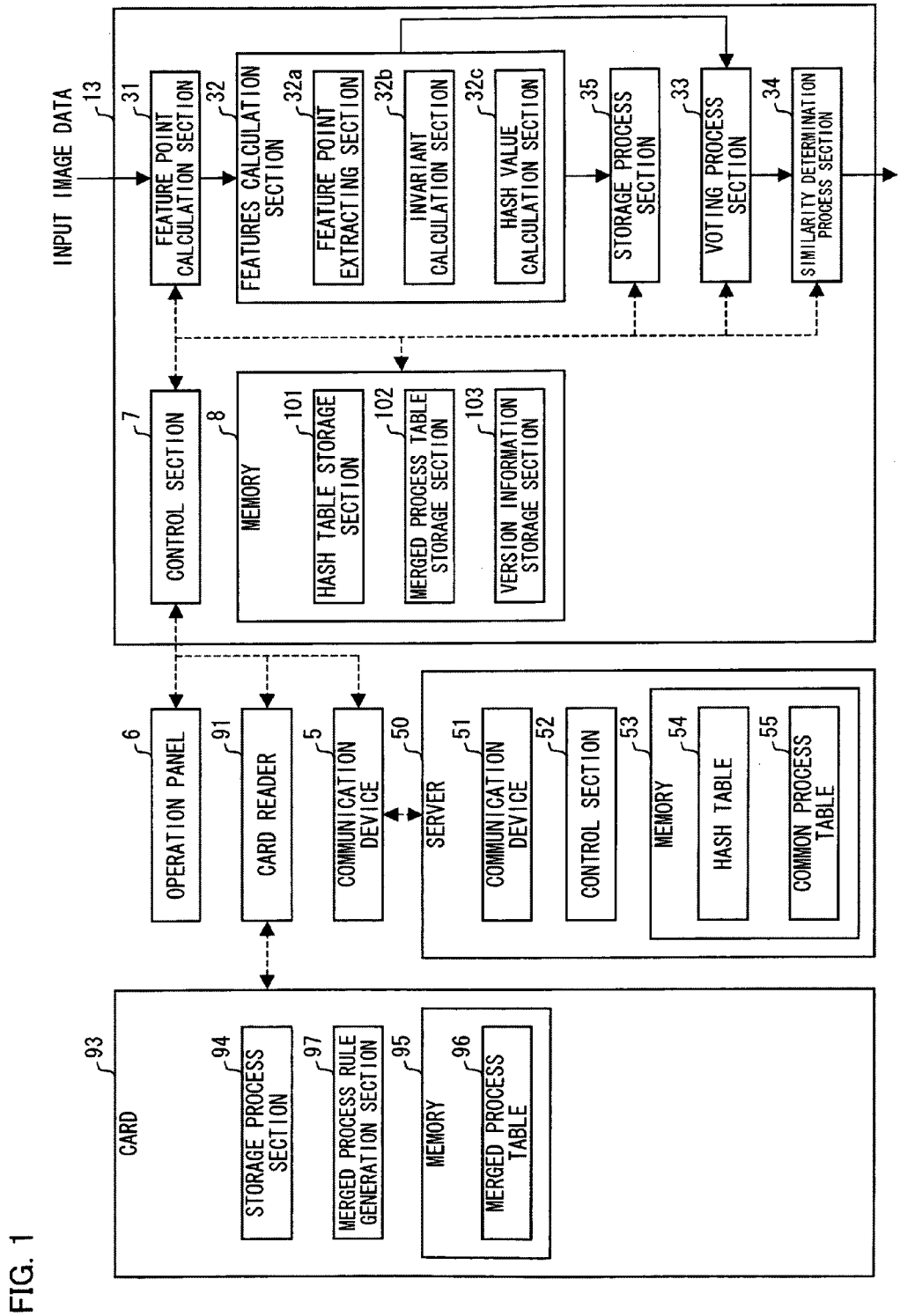
FIG. 1 is a block diagram schematically illustrating a configuration of an image processing system in accordance with an embodiment of the present invention.

FIG. 1 is a block diagram schematically illustrating arrangements of the document matching process section 13 and the card 93. As illustrated in FIG. 1, the document matching process section 13 includes a feature point calculation section 31, a features (feature vectors) calculation section 32, a voting process section 33, a similarity determination process section 34, a storage process section 35, a control section 7, and a memory section 8.

The control section 7 controls operations of the sections of the document matching process section 13 in accordance with an instruction inputted by the user via the operation panel 6 or the communication device 5. Note that, the control section 7 may be provided in the main control section for controlling operations of the sections of the digital color multi-function printer 1 or may be provided separately from the main control section so as to cooperate with the main control section in controlling operations of the document matching process section 13.

Further, in case where it is determined that there is similarity (the input image data is identical to image data of the reference image), the control section 7 carries out a process with respect to the input image data in accordance with a merged process rule stored in the memory 95 of the card 93 so as to correspond to the reference image. This process will be detailed later.

The memory 8 stores various data, a processing result, and the like, which are used in the processing of each section of the document matching process section 13. Further, the memory 8 includes a hash table storage section 101, a merged process table storage section 102, and a version information storage section 103.

In the hash table storage section 101, the hash table received from the server 50 is stored (a copy of the hash table 54 stored in the server 50 is stored into the hash table storage section 101). Herein, the hash table refers to a table in which an ID (identification information for identifying the reference image; index) of the reference image and a hash value (features) of the reference image correspond to each other. In the present embodiment, an original hash table is stored in the memory 53 of the server 50, and a copy of the hash table stored in the server 50 is reserved in each terminal apparatus of the image processing system 100. However, the arrangement is not limited to this, and it may be so arranged that: in case where a speed of a communication between the server 50 and the terminal apparatus is sufficiently high for example, the hash table is not reserved in the terminal apparatus and the terminal apparatus suitably accesses the server 50 and uses the hash table 54 stored in the server 50 so as to carry out below-described similarity determination process, storage process, and the like.

In the merged process table storage section 102, a merged process table read out from the card 93 is stored (a copy of the merged process table 96 stored in the card 93 is stored into the merged process table storage section 102). Note that, in the present embodiment, the process table refers to a table in which an ID of the reference image and a process rule for the reference image correspond to each other. Further, the process rule of the present embodiment include: a common process rule which is common for all users (or all groups); an individual process rule set for each user (or each group); and a merged process rule obtained by combining (merging) the common process rule with the individual process rule.

The common process rule is a rule which is commonly applied to the input image data regardless of conditions such as (a) user having inputted the input image data, (b) a group to which the user belongs (attribute of the user), (c) a type of the card inserted into the card reader 91, (d) and the like, in case where it is determined that the input image data is similar to the reference image.

The content of the common process rule is not particularly limited, but examples thereof include (i) an operation for prohibiting execution of copying, filing, electronic distribution, facsimile transmission, and the like, (ii) an order for permitting only a specific user to execute a process by carrying out user authentication, (iii) an operation for partially blacking out the input image data so as to output the blacked out input image data, (iv) an operation for adding or overlaying onto the input image data a predetermined image (e.g., an image for specifying the user or the multi-function printer, an image indicating that a process with respect to the image is restricted (or prohibited), or a similar image) so as to output the resultant image, (v) an operation for storing the input image data into a predetermined folder, (vi) an operation for transmitting the input image data to a predetermined electronic distribution destination. Note that, in case of adding a predetermined image as in (iv), an image visible for the user may be added or an image invisible for the user (e.g., an image which can be confirmed by carrying out a predetermined operation) may be added.

The individual process rule is a rule which is indicative of a process applied to the input image data and which is set for each user (or for each group) in case where it is determined that the input image data is similar to the reference image.

The content of the individual process rule is not particularly limited, but examples thereof include (1) an operation for transmitting the input image data to a mail address of a predetermined electronic distribution destination, (2) an operation for storing the input image data into a predetermined folder, (3) an operation for converting the input image data into a predetermined file format (e.g., PDF, JPEG, or TIFF), (4) an operation for outputting the input image data at a predetermined resolution, in a color or monochrome manner, with a tone (24 bits, 8 bits, 1 bit, or the like) (an operation for forming an image, transmitting data, filing, or a similar operation), (5) an operation for carrying out a predetermined halftone process (simple binarization, dithering process, error diffusion process, and the like), (6) an operation for carrying out compression (e.g., JPEG compression) at a predetermined compression ratio, (7) an operation for copying under a predetermined condition (one-sided copies from one-sided originals, two-sided copies from one-sided originals, two-sided copies from two-sided originals, or one-sided copies from two-sided originals, conversion into Nin1 mode, selection of a predetermined sheet size, or a similar condition), (8) an operation for outputting every predetermined number of copies or outputting copies one by one (image formation, data transmission, filing, and the like), (9) an operation for carrying out facsimile transmission to a predetermined transmission destination, (10) an operation for transmitting the read image data by IrDA (infrared communication) or Bluetooth, (11) an operation for carrying out an OCR process, (12) an operation for carrying out encryption, (13) an operation for correcting skew of the document (skew correction) or carrying out vertical-direction correction, (11) an operation for removing a specific color so as to output the resultant image (image formation, data transmission, filing, and the like) (for example, a blue format part is removed from a form having some writings therein (in case where a format including frames and letters is printed blue), and a similar operation.

The merged rule is a process rule obtained by merging the common process rule with the individual process rule and is stored in the memory 95 of the card 93. Further, the user can intentionally add or change the registered process associated with the individual process rule of the merged process rule.

FIG. 5 is an explanatory drawing illustrating an example of a common process table 55 stored in the server 50. In the example illustrated in FIG. 5, there are set process rules respectively indicating that: copying of input image data similar to a reference image ID1 or ID4 is prohibited, and input image data similar to a reference image ID2 is electronically distributed to a mail address 1, and input image data similar to a reference image ID3 is filed in a folder of a path 1, and input image data similar to a reference image IDn-1 is electronically distributed to a mail address n-1. Further, there is set a process rule showing that: input image data similar to a reference image ID5 is filed. However, a path of a folder to which the input image data is to be filed is not set, and the user inputs the folder to which the input image data is to be filed or the user specifies, in the individual process rule, the path of the folder to which the input image data is to be filed.

FIG. 6 is an explanatory drawing illustrating an example of a merged process table obtained by merging the common process rule of FIG. 5 to the individual process rule (not shown). In the example illustrated in FIG. 6, there are set process rules based on the common process rule, concerning input image data similar to the reference images ID1 to ID4 and IDn-1. While, the input image data similar to the reference image ID5 is set so as to be filed into a folder of a path 2. Further, in addition to the reference image of the common process rule, a reference image IDn is registered. There is set a process rule (individual process rule) for prohibiting execution of copying of input image data similar to the reference image IDn.

Note that, as in the case of carrying out electronic distribution, it may be so arranged that: the common process rule specifies that electronic distribution is carried out without specifying an address or the like of the distribution destination, and the user inputs the address of the electronic distribution destination in carrying out an electronic distribution process or the individual process rule specifies an address or the like of the electronic distribution. Further, as illustrated in FIG. 7(*a*) and FIG. 7(*b*), it may be so arranged that: an IP address of the electronic distribution destination can be referred to in the common process table and the merged process table by a predetermined referring method (for example, by IDIPk (k is an integer)), and in case where a certain IP address is changed in the common process table or the merged process table, all IP addresses corresponding to the IP address are changed in the common process table or the merged process table in the same manner.

Note that, in the present embodiment, a merged process rule read from the card 93 is stored into the merged process table 102, but the arrangement is not limited to this, and it may be so arranged that the merged process table 102 is omitted and the document matching process section 13 suitably accesses the merged process table stored in the card 93.

Version information of the common process table 55 stored in the server 50 is received from the server 50 and is stored in the version information storage section 103.

As illustrated in FIG. 1, the server 50 includes the communication device 51, the control section 52, and the memory 53.

The communication device 51 allows the terminal apparatuses connected via a network to communicate with each other. The control section 52 controls operations of sections of the server 50.

The memory 53 stores therein various kinds of data used in processes of the sections of the server 50, results of the processes, and the like. Further, the memory 53 includes the hash table 54 and the common process table 55.

The hash table 54 is a table in which ID (identification information) of each reference image and features of each reference image correspond to each other. Note that, in the present embodiment, the hash table 54 is arranged so that IDs and features of both a reference image corresponding to the common process rule and a reference image corresponding to the individual process rule are stored therein.

In the common process table 55, the common process rule and ID of the reference image to which the common process rule is applied are stored with them corresponding to each other. Further, in the common process table 55, version information of the common process rule is stored. The version information is not particularly limited as long as the information allows for determination of whether the common process table is the latest version or not. For example, a date on which the common process table was previously updated, the number or mark indicative of a version, and similar information can be used.

As illustrated in FIG. 1, the card 93 includes a storage process section 94, a memory 95, and a merged process rule generation section 97.

The storage process section 94 writes information onto the memory 95, reads out information from the memory 95, and exchanges information with the digital color multi-function printer 1. Further, the storage process section 94 sends the common process rule, the individual process rule, and the ID of the reference image, which have been inputted from the digital color multi-function printer 1, to the merged process rule generation section 97, and controls operation of the merged process rule generation section 97 so as to generate the merged process rule. Further, the storage process section 94 stores the merged process rule generated by the merged process rule generation section and ID of a reference image corresponding to the merged process rule into the merged process table 96 of the memory 95 so that the merged process rule and the ID correspond to each other. Further, the storage process section 94 stores, into the merged process table 96, version information of the common process rule used to generate the merged process rule.

The merged process rule generation section 97 merges the common process rule with the individual process rule inputted from the digital color multi-function printer 1 so as to generate the merged process rule.

At this time, as to a reference image in which only one of the common process rule and the individual process rule exists, the merged process rule is generated so that the aforementioned one rule is applied.

On the other hand, in case where both of the common process rule and the individual process rule exist as to a single reference image, the merged process rule is generated on the basis of a predetermined condition. The predetermined condition is not particularly limited. However, for example, in case where the common process rule prohibits or restricts a process of the input image data (for example, in case of prohibiting processes such as copying, electronic distribution, facsimile transmission, filing, and the like, or in case of partially blacking out an image corresponding to the input image data, or in case of a process for adding, to an image corresponding to the input image data, information specifying an output apparatus or information indicating that the image is a copy), the merged process rule is generated so that the common process rule is applied. Further, in case where the common process rule and the individual process rule neither prohibit nor restrict the process (for example, in case of storing the input image data into a predetermined folder, or in case of a process for transmitting the input image data to a predetermined destination), the merged process rule may be generated so that the individual process rule is applied or the merged process rule may be generated so that both the common process rule and the individual process rule are applied.

The memory card 95 is a memory which stores therein various kinds of data concerning the card 93 (e.g., card ID, user ID, ID of a group to which the user belongs, various control data, and the like). Further, the memory 95 includes the merged process table 96.

In the merged process table 96, the merged process rule and ID of a reference image to which the merged process rule is adopted are stored with them corresponding to each other. Further, in the merged process table 96, version information of the common process rule (common process table) used in generating the latest merged process rule is stored.

The feature point calculation section 31 extracts a junction of a text sequence or a ruled line and performs calculation with a centroid of the junction used as a feature point. However, the arrangement of the feature point calculation section 31 is not limited to this, and the feature point may be calculated in accordance with various conventionally known methods for example.

Figures 8, 9:
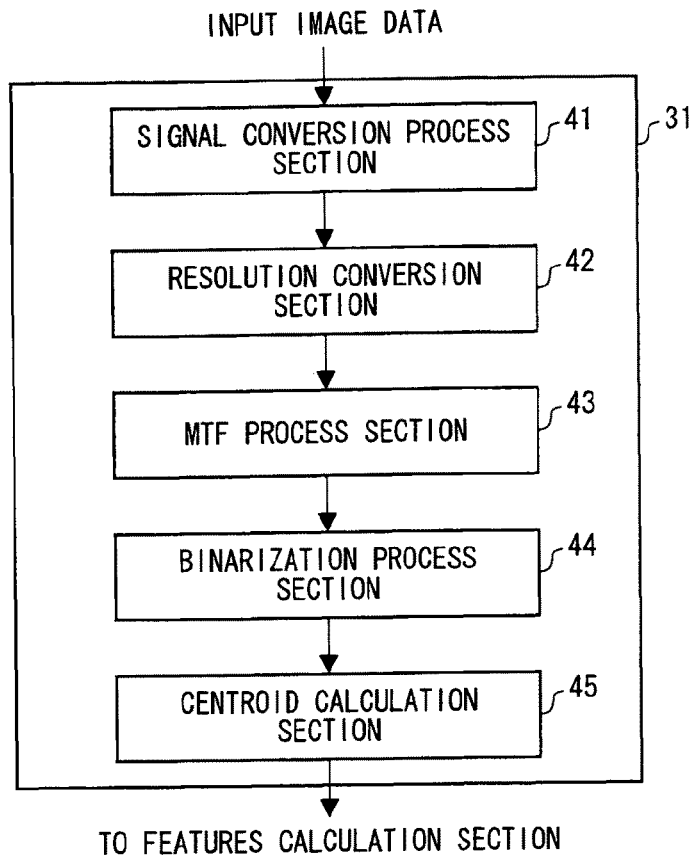
FIG. 8 is a block diagram schematically illustrating a feature point calculation section included in the image processing apparatus in FIG. 3.
FIG. 9 is an explanatory drawing illustrating an example of a filter coefficient of a mixture filter included in an MTF processing section of the image processing apparatus in FIG. 3.

FIG. 8 is a block diagram schematically illustrating an arrangement of the feature point calculation section 31. As illustrated in FIG. 8, the feature point calculation section 31 includes a signal conversion process section (achromatization process section) 41, a resolution changing section 42, an MTF process section 43, a binarization process section 44, and a centroid calculation section 45.

In case where image data (RGB signals) inputted from the shading correction section 12 is color image, the signal conversion process section 41 achromatizes the image data and converts the achromatized image data into a brightness signal or a luminance signal.

For example, the signal conversion process section 41 converts the RGB signals into a luminance signal Y in accordance with the following expression (1).

$$Yi = 0.30Ri + 0.59Gi + 0.11Bi \qquad (1)$$

"Y" refers to a luminance signal of each pixel, and each of R, G, and B is a color component of the RGB signals, and "i" subsequently added to each of Y, R, G, B represents a value given to each pixel (i is an integer not less than 1).

Alternatively, the RGB signals may be converted into CIE1976L*a*b* signal (CIE: Commission International de l' Eclairage, L*: brightness, a*, b*: chromaticity).

The resolution changing section 42 scales up/down the input image data. For example, in case where the input image data is optically scaled up/down by the image input device 2, the resolution changing section 42 scales up/down the input image data again so as to have a predetermined resolution. Further, in order to reduce processes carried out by the subsequent processing sections, the resolution changing section 42 may change resolution so as to make the resolution lower than a resolution in being read by the image input device 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress an unnecessary high frequency component in extracting feature points by the subsequent centroid calculation section 45. That is, a mixing filter (not shown) is used to carry out an emphasizing process and a smoothing process. Note that, FIG. 9 illustrates an example of a filter coefficient of the mixing filter.

The binarization process section 44 compares achromatized image data (luminance value (luminance signal) or brightness value (brightness signal)) with a preset threshold value so as to binarize the image data.

Figure 10:
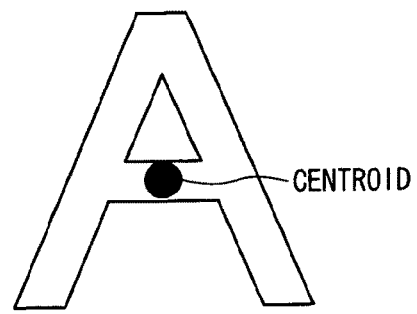
FIG. 10 is an explanatory drawing illustrating an example of a junction extracted from input image data by the feature point calculation section in the image processing apparatus in FIG. 3 and a centroid of the junction.
Figure 11:
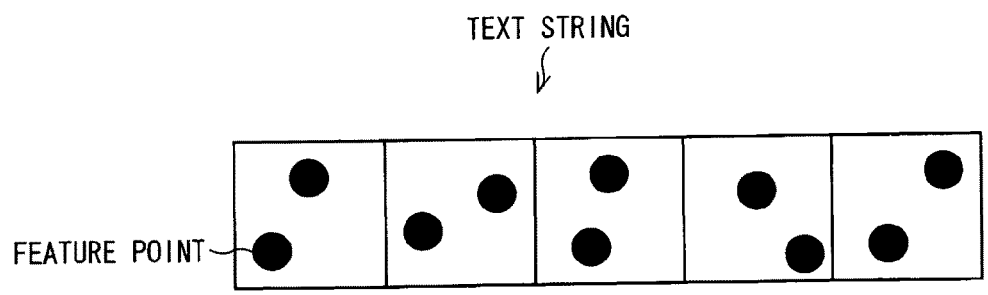
FIG. 11 is an explanatory drawing illustrating an example of centroids (feature points) of junctions extracted from a text sequence in input image data by the feature point calculation section in the image processing apparatus in FIG. 3.

The centroid calculation section 45 carries out labeling (labeling process) with respect to each pixel in accordance with the image data binarized by the binarization process section 44 (for example, the binarized data is represented by "1" or "0"). Further, a junction between pixels having the same label is specified and a centroid of the specified junction is extracted as a feature point. Further, the extracted feature point is outputted to the features calculation section 32. FIG. 10 is an explanatory drawing illustrating the junction extracted from the input image data and a centroid of the junction as an example. In this figure, the junction corresponding to a text sequence "A" and the centroid thereof are illustrated. Further, FIG. 11 is an explanatory drawing illustrating an example of centroids (feature points) of plural junctions extracted from a text sequence included in the input image data. Note that, the feature point can be expressed by coordinate values (X coordinate, y coordinate) of a binary image.

The features calculation section 32 includes a feature point extracting section 32a, an invariant calculation section 32b, and a hash value calculation section 32c. A feature point calculated by the feature point calculation section 31 is used for the features calculation section 32 to calculate features (hash value and/or invariant) which is invariable relative to geometric transformation such as rotation, parallel shift, scaling up, scaling down, parallel shift, and the like of a document image.

Figure 12:
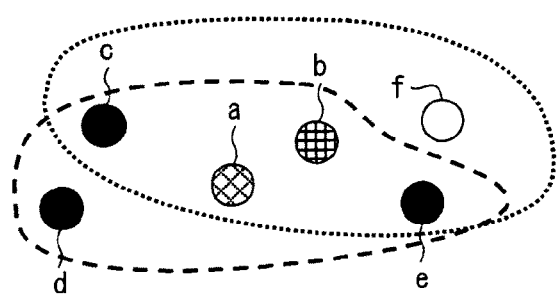
FIG. 12 is an explanatory drawing illustrating examples of a target feature point and a peripheral feature point that are extracted at a time when a features calculation section in the image processing apparatus in FIG. 3 calculates features.

As illustrated in FIG. 12, the feature point extracting section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 12, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 13:
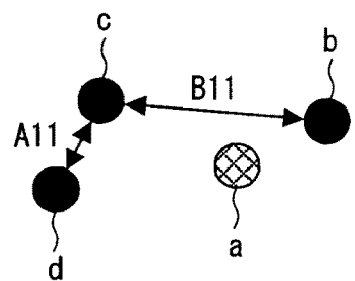
FIGS. 13(a) to 13(c) are explanatory drawings each illustrating an example of a combination of a target feature point and a peripheral feature point that are extracted at a time when the features calculation section in the image processing apparatus in FIG. 3 calculates features.
Figure 13:
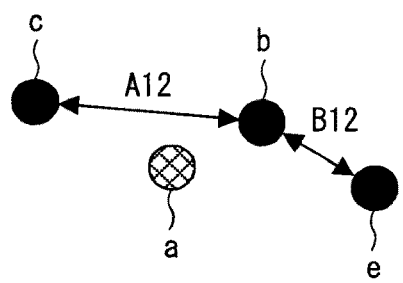
Figure 13:
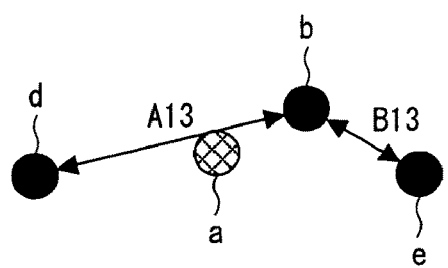

Further, the feature point extracting section 32a extracts a combination of three points which can be selected from the four peripheral feature points extracted in the foregoing manner. For example, as illustrated in FIGS. 13(a) to 13(c), in case where a feature point a is regarded as a target feature point, a combination of three feature points b, c, and e, that is, a combination of peripheral feature points b, c, and d and a combination of peripheral feature points b, d, and e are extracted.

Next, the invariant calculation section 32b calculates an invariant (one of features) Hij of the extracted combination relative to geometrical transformation. Herein, "i" represents the number indicative of each target feature point (i is an integer not less than 1), and "j" represents the number of combinations of three peripheral feature points. In the present embodiment, a ratio of lengths of two lines connecting the peripheral feature points is set as the invariant Hij. Note that, the lengths of the lines are calculated in accordance with coordinates of the peripheral feature points. For example, in FIG. 13(a), when a length of a line connecting the feature point c and the feature point d is A11 and a length of a line connecting the feature point c and the feature point b is B11, the invariant H11 is such that H11=A11/B11. Further, in FIG. 13(b), when a length of a line connecting the feature point c and the feature point b is A12 and a length of a line connecting the feature point b and the feature point e is B12, the invariant H12 is such that H12=A12/B12. Further, in FIG. 13(c), when a length of a line connecting the feature point d and the feature point b is A13 and a length of a line connecting the feature point b and the feature point e is B13, the invariant H13 is such that H13=A13/B13. In this manner, the invariants H11, H12, and H13 are calculated in the examples illustrated in FIGS. 13(a) to 13(c). Note that, in the foregoing examples, a line connecting a peripheral feature point positioned at the left side in the horizontal direction and a peripheral feature point positioned at the center in the horizontal direction is indicated as Aij and a line connecting a peripheral feature point positioned at the center in the horizontal direction and a peripheral feature point positioned at the right side in the horizontal direction is indicated as Bij, but the definition is not limited to this, and the lines used to calculate the invariant Hij may be set in any manner.

Next, the hash value calculation section 32c calculates a remainder of $(Hi1 \times 10^2 + Hi2 \times 10^1 + Hi3 \times 10^0)/D$ as a hash value (one of features) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that $n \geq 5$), or a value calculated in accordance with an arrangement of m points extracted from n points in the vicinity of the target feature point (m is such an integer that m<n and $m \geq 5$) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, the calculation of the hash value Hi is not limited to the foregoing calculation, that is, the calculation is not limited to the manner in which a remainder of $(Hi1 \times 10^2 + Hi2 \times 10^1 + Hi3 \times 10^0)/D$ is calculated as a hash value (one of features) Hi, and other hash function may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 14:
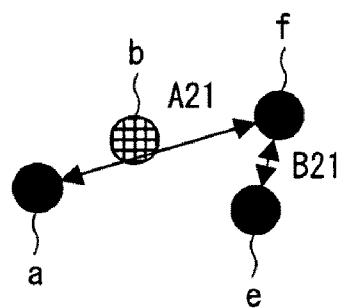
FIGS. 14(a) to 14(c) are explanatory drawings each illustrating an example of a combination of a target feature point and a peripheral feature point that are extracted at a time when the features calculation section in the image processing apparatus in FIG. 3 calculates features.
Figure 14:
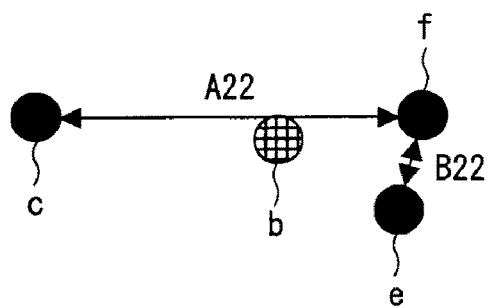
Figure 14:
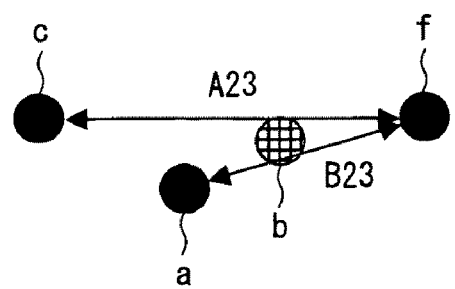
Figure 15:
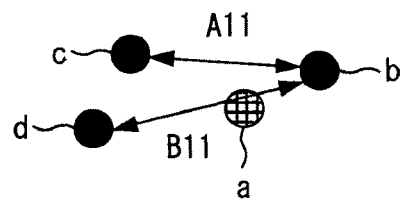
FIGS. 15(a) to 15(d) are explanatory drawings each illustrating an example of an index indicative of a hash value regarding a feature point that is stored in a hash table and input image data.
Figure 15:
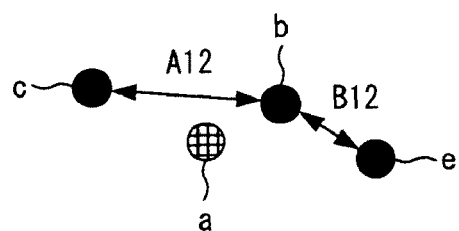
Figure 15:
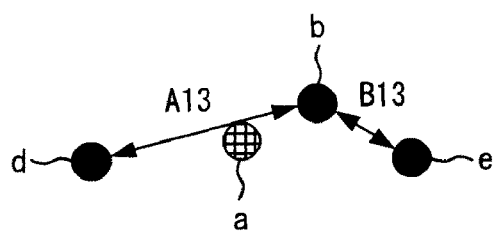
Figure 15:
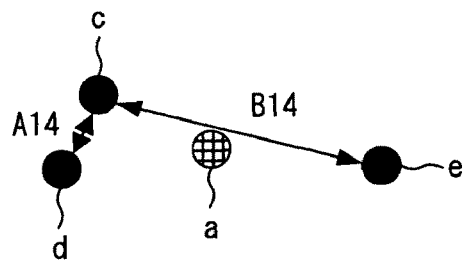
Figure 16:
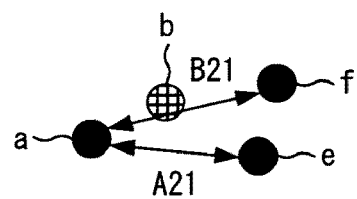
FIGS. 16(a) to 16(d) are explanatory drawings each illustrating an example of an index indicative of a hash value regarding a feature point that is stored in a hash table and input image data.
Figure 16:
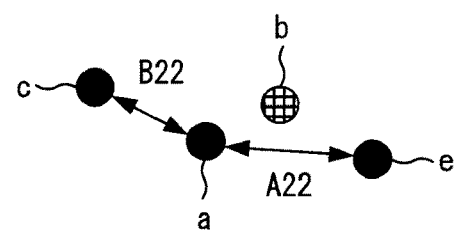
Figure 16:
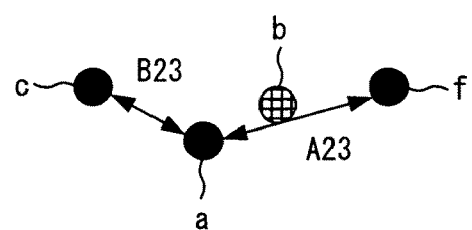
Figure 16:
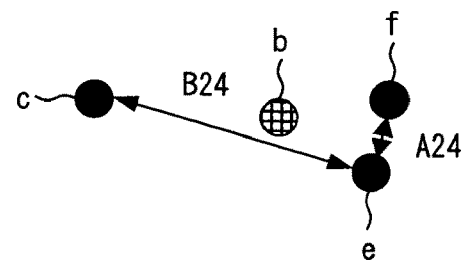

In FIG. 12, when extraction of peripheral feature points around a feature point a regarded as a target feature point and calculation of a hash value are completed, peripheral feature points around a feature point b regarded as a target feature point are extracted and a hash value is calculated. In FIG. 12, four feature points a, c, e, and f are extracted as peripheral feature points in case where the feature point b is regarded as a target feature point. Further, as illustrated in FIGS. 14(a) to 14(c), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, how to calculate the invariant when the feature point a is regarded as the target feature point is not limited to the aforementioned manner. For example, it may be so arranged that: as illustrated in FIG. 15(a) to FIG. 15(d), in case where the feature point a illustrated in FIG. 12 is regarded as the target feature point, a combination of three points out of peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of features) Hij relative to geometric transformation is calculated with respect to each of the extracted combinations.

Further, it may be so arranged that: in case where the feature point b illustrated in FIG. 12 is regarded as the target feature point, as illustrated in FIGS. 16(a) to 16(d), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1 \times 10^3 + Hi2 \times 10^2 + Hi3 \times 10^1 + Hi4 \times 10^0)/D$ is calculated as a hash value, and the calculated hash value is stored in the memory 8.

In the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

Note that, in case of storing the input image data as a reference image, the features calculation section 32 transmits the hash value (features) calculated in the foregoing manner and corresponding to each feature point of the input image data to the storage process section 35.

The storage process section 35 transmits (i) hash values calculated by the features calculation section 32 and corresponding to the respective feature points and (ii) IDs (document IDs) each indicative of a document (reference image) to the server 50 via the communication device 5. The control section 52 of the server 50 transmits the hash values and the IDs each indicative of a document (reference image), which have been received from the terminal apparatus, to the server 50 with the hash values and the IDs corresponding to each other, and the control section 52 of the server 50 sequentially registers the hash values and the IDs into the hash table 54 (see FIG. 17(a)). In case where the hash values have already been stored, the document IDs are stored with them respectively corresponding to the hash values. The document IDs are serially assigned to the respective documents without any duplication. Note that, in case where the number of documents stored in the hash table 102 is larger than a predetermined value (for example, 80% of the number of documents which can be stored), old document IDs may be searched and sequentially deleted. Further, the deleted document IDs may be reused as document IDs of new reference images. Further, in case where the calculated hash values are identical to each other (H1=H5 in FIG. 17(b)), these values may be collectively stored into the hash table.

Further, in case of registering an image to which the common process rule is to be applied, the storage process section 35 transmits the ID of the reference image and the common process rule for the reference image to the server 50 via the communication device 5. The control section 52 of the server 50 stores, into the common process table 55, the reference image ID and the common process rule, which have been received from the terminal apparatus, with them corresponding to each other. The common process rule is set by the control section 7 in response to a user's instruction obtained via the operation panel 6 or the communication device 5 for example.

Further, in case of registering an image to which the individual process instruction is to be applied, the storage process section 35 transmits an ID of the reference image and the individual process rule for the reference image to the card 93 via the card reader 91. The individual process rule is set by the control section 7 in response to a user's instruction obtained via the operation panel 6 or the communication device 5 for example. Note that, in case where the common process rule for the reference image is stored in the common process table 55 of the server 50, the storage process section 35 transmits not only the ID of the reference image and the individual process rule for the reference image but also the common process rule for the reference image and version information thereof to the card 93. Alternatively, in case of registering an image to which the individual process rule is to be applied, the storage process section 35 may transmit the ID of the reference image, the individual process rule for the reference image, the latest common process table stored in the server 50, and the version information of the common process table, to the card 93.

Further, in case of carrying out a matching process (similarity determination process) for determining whether the input image data is identical to image data of a reference image having already been registered, the features calculation section 32 transmits hash values of the feature points of the input image data, which have been calculated in the foregoing manner, to the voting process section 33.

Note that, in the present embodiment, before carrying out a voting process, the content registered in the hash table 54 of the server 50 is read out and stored into the hash table storage section 54 of the memory 8, and the content registered in the merged process table 96 of the card 93 is read out and stored into the merged process table storage section 102 of the memory 8.

Figure 18:
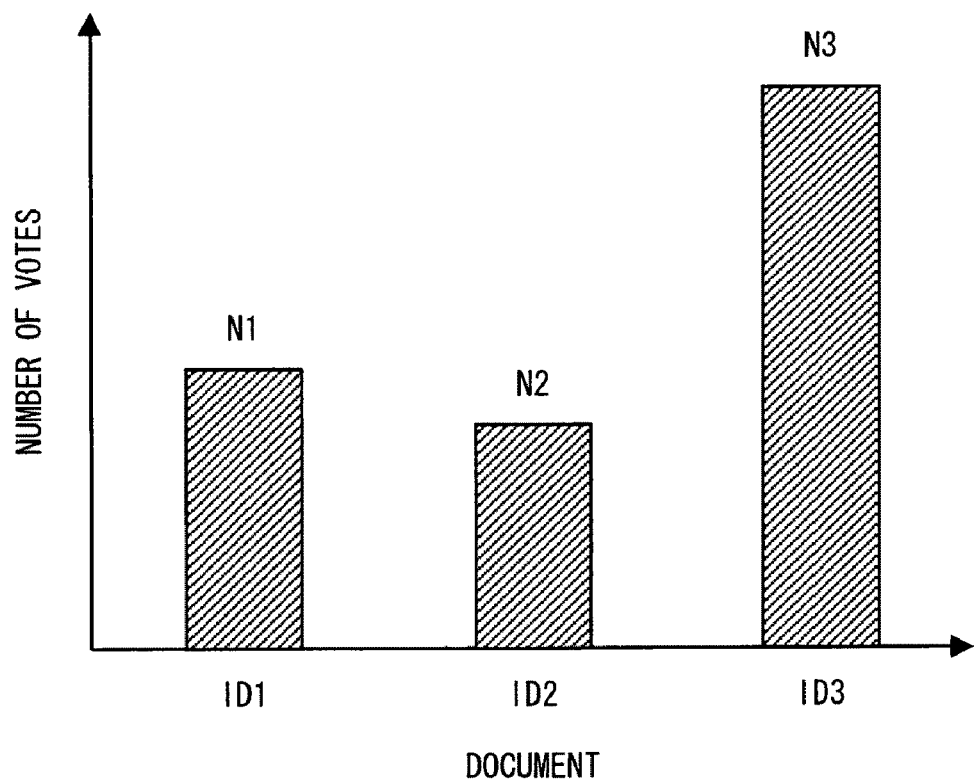
FIG. 18 is a graph illustrating an example of the number of votes for each reference image in a in a voting process section of the image processing apparatus in FIG. 3.

The voting process section 33 compares the hash value calculated from the input image data and corresponding to each feature point with the hash values (hash value of the common process image and hash value of the individual process image) stored in the hash table 101 so as to vote for a reference image having the same hash value. In other words, there is counted the number of times the same hash value as a hash value of the reference image is calculated from the input image data for each reference image, and the counted number is stored in the memory 8. FIG. 18 is a graph illustrating an example of the number of votes for reference images ID1, ID2, and ID3.

The similarity determination process section 34 reads out a voting result of the voting process section 33 (an index of each reference image and the number of votes obtained for each reference image: similarity) from the memory 8, and extracts the maximum number of votes obtained and an index of a reference image obtaining the maximum number of votes. Further, the similarity determination process section 34 compares the maximum number of votes obtained with a predetermined threshold value so as to determine whether there is any similarity or not (whether the input image data is identical to image data of the reference image or not), and sends a determination signal indicative of the determination result to the control section 7. That is, in case where the maximum number of votes obtained is not less than a predetermined threshold value, it is determined that "there is similarity (the input image data is identical to image data of the reference image)", and in case where the maximum number of votes obtained is less than the threshold value, it is determined that "there is no similarity (the input image data is not identical to image data of the reference image)".

Alternatively, it may be so arranged that: the similarity determination process section 34 divides the number of votes obtained for each reference image by a total number of votes obtained (total number of feature points extracted from the input image data) and normalizes the result so as to calculate the similarity, thereby comparing the similarity with a predetermined threshold value (80% of the number of total votes obtained for example) to determine the similarity.

Further, it may be so arranged that: the similarity determination process section 34 divides the number of votes obtained for each reference image by the number of times of storage of a hash value (maximum number of times a hash value is registered) corresponding to a reference image whose hash value is most frequently stored and normalizes the result so as to calculate the similarity, thereby comparing the similarity with a predetermined threshold value (80% of the number of total votes obtained for example) to determine the similarity. That is, in case where the calculated similarity is not less than a threshold value TH2, it is determined that "there is similarity", and in case where the calculated similarity is less than the threshold value TH2, it is determined that "there is no similarity". Note that, in this case, the total number of hash values extracted from the input image data may be larger than the maximum number of times of storage of a hash value (particularly, a case where the document and/or the reference image partially has a handwritten part), so that the calculated value of the similarity may exceed 100%.

Further, the threshold value TH2 in determining the similarity may be constant for each reference image or may be set for each reference image in accordance with importance or the like of the reference image. As to the importance of the reference image, for example, a paper current, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value TH2 corresponding to the reference image obtaining the maximum number of votes.

Further, it may be so arranged that: in determining the similarity, the threshold value TH2 is made constant and the number of votes obtained for each reference image is multiplied by a weighting coefficient of each reference image so as to determine the similarity. In this case, the weighting coefficient according to the importance of each reference image is stored in the memory 8 with the weighting coefficient corresponding to an index of each reference image, and the similarity determination process section 34 calculates a corrected number of obtained votes by multiplying the number of votes obtained for each reference image by the weighting coefficient of the reference image, thereby determining the similarity in accordance with the corrected number of votes obtained. For example, a maximum corrected number of votes obtained may be compared with the threshold value TH2, or a value obtained by normalizing the maximum corrected number of obtained votes by the number of total votes obtained may be compared with the threshold value TH2, or a value obtained by normalizing the maximum corrected number of obtained votes by the maximum number of times of storage may be compared with the threshold value TH2. Further, in this case, for example, the weighting coefficient is set to be more than 1 and to be larger as the reference image is more important.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

In case where there is a reference image determined as being similar by the similarity determination process section 34, the control section 7 processes the input image data in accordance with the process rule stored with it corresponding to the reference image.

(1-3. Processes in Image Processing System 100)

Figure 19:
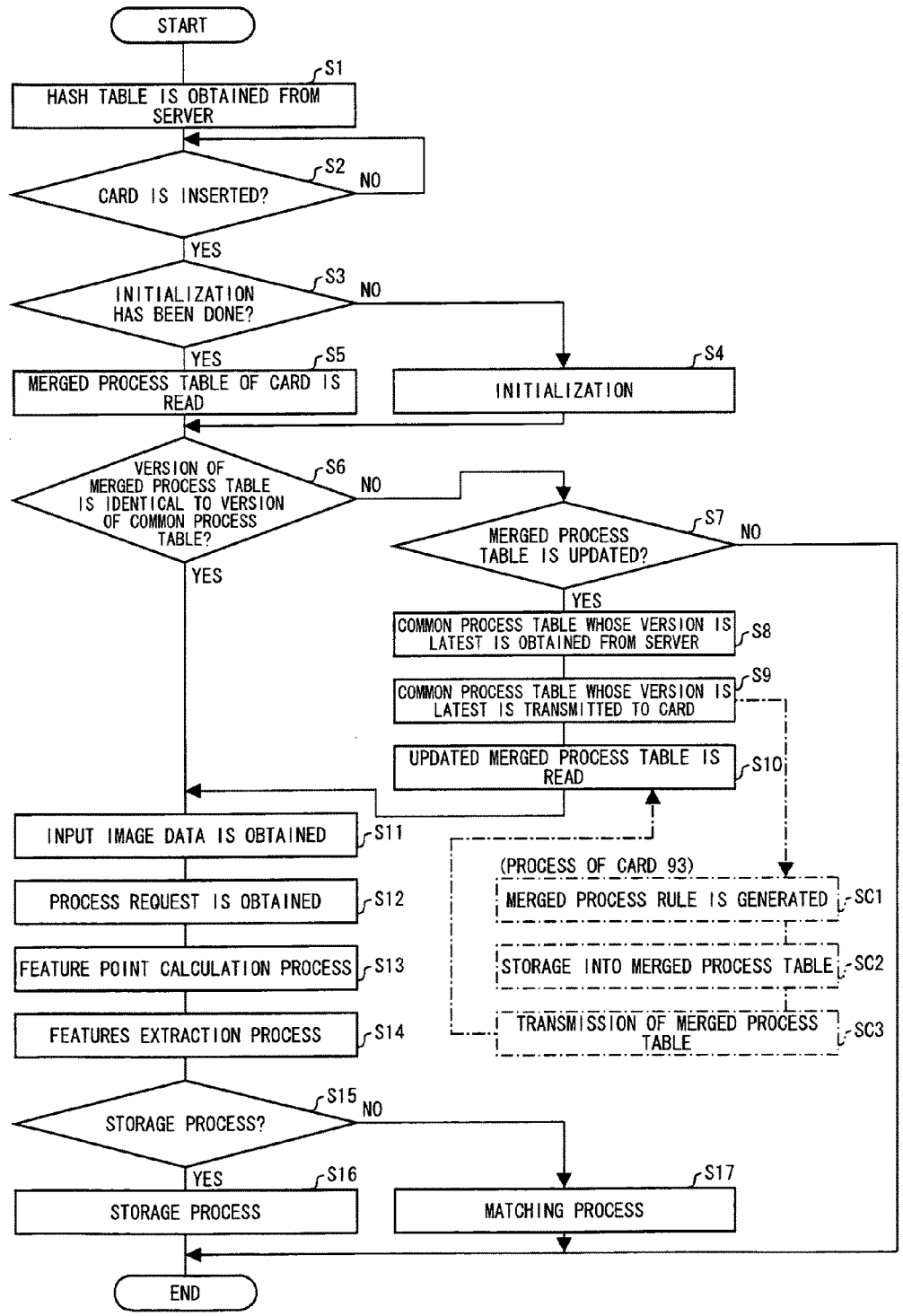
FIG. 19 is a flowchart illustrating a flow of a process in the image processing system in accordance with an embodiment of the present invention.
Figure 20:
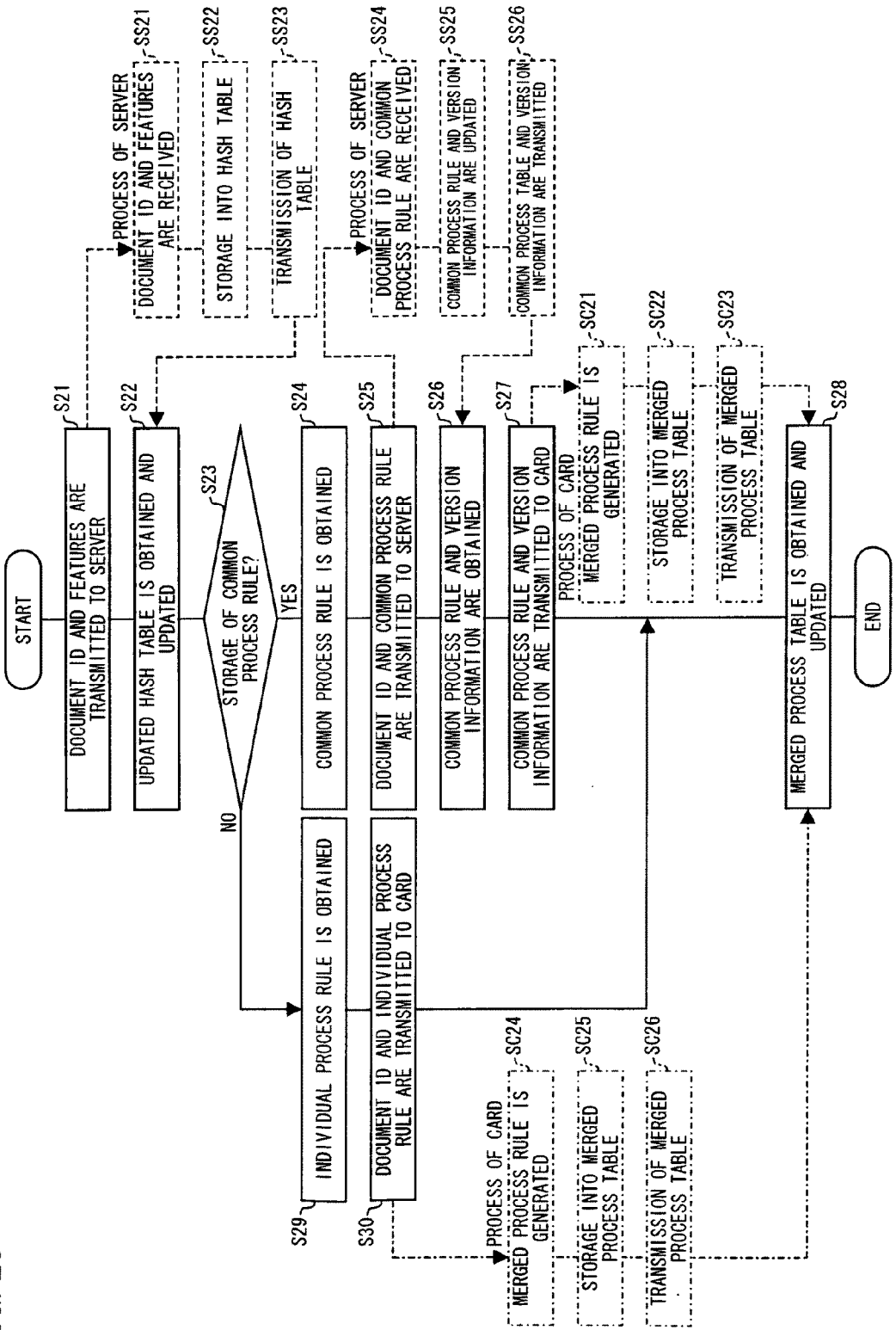
FIG. 20 is a flowchart illustrating a flow of a storage process in the image processing system in accordance with an embodiment of the present invention.
Figure 21:
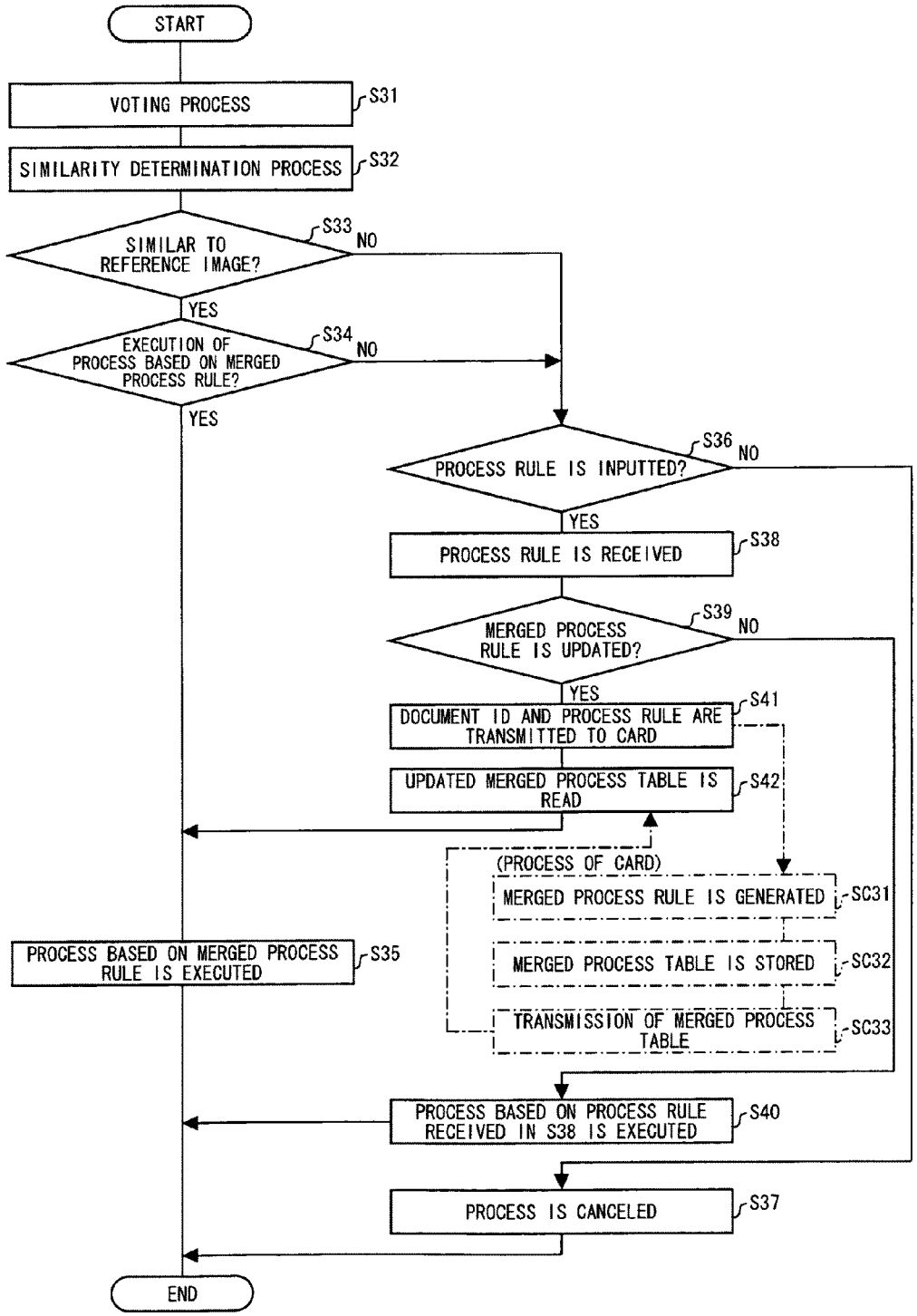
FIG. 21 is a flowchart illustrating a flow of a similarity determination process in the image processing system in accordance to an embodiment of the present invention.

Next, processes in the digital color multi-function printer 1 are described as follows with reference to flowcharts of FIG. 19 to FIG. 21. Note that, FIG. 19 is a flowchart illustrating a flow of a common process carried out in case of the similarity determination process (matching process) and in case of the storage process. FIG. 20 is a flowchart illustrating a flow of the storage process. FIG. 21 is a flowchart illustrating a flow of the similarity determination process (matching process). Note that, in FIG. 19 to FIG. 21, a continuous line indicates a process in the digital color multi-function printer 1, a dotted line indicates a process in the server 50, and a chain line indicates a process in the card 93.

When a power switch of the digital color multi-function printer 1 is turned ON, the control section 7 obtains (downloads) the hash table from the server 50 so as to store the hash table into the hash table storage section 101 of the memory 8 and obtains version information of the common process table from the server 50 so as to store the version information into the version information storage section 103 (S1). Specifically, the control section 7 transmits a request for transmission of the hash table and the version information to the server 50 via the communication device 5. Upon receiving the request for transmission via the communication device 51, the control section 52 of the server 50 reads out the hash table 54 stored in the memory 53 and transmits the hash table 54 to the digital color multi-function printer 1. Further, the control section 52 reads out the version information of the common process table which version information is included in the common process table 55 and transmits the version information to the digital color multi-function printer 1. Further, the control section 7 of the digital color multi-function printer 1 stores the hash table, transmitted from the server 50, into the hash table storage section 101 of the memory 8, and stores the version information into the version information storage section 103.

Note that, herein, the version information of the common process table is stored into the memory 8 of the digital color multi-function printer 1, but the arrangement is not limited to this. For example, it may be so arranged that the copy of the common process table 55 stored in the server 50 is stored into the memory 8 of the digital color multi-function printer 1. Further, the version information is not necessarily stored in the memory 8 of the digital color multi-function printer 1, but it may be so arranged that the control section 7 accesses the server 50 as necessary so as to obtain the version information. Further, the foregoing description explained the arrangement in which the hash table is downloaded from the server 50 when the digital color multi-function printer 1 is turned ON, but the arrangement is not limited to this. For example, it may be so arranged that the hash table is downloaded at each predetermined period, or it may be so arranged that the hash table is downloaded in response to an instruction given by the user, or it may be so arranged that the hash table is downloaded every time the input image data is inputted, or it may be so arranged that the hash table is downloaded every time the card 93 is inserted. Further, it may be so arranged that: when the hash table or the common process table stored in the server 50 is updated, the control section 52 of the server 50 transmits the updated hash table, common process table, version information, and the like, to each terminal apparatus.

Thereafter, the control section 7 monitors insertion of the card 93 into the card reader 91 (S2). Further, when the card 93 is inserted into the card reader 91, the control section 7 determines whether default of the inserted card 93 has been set or not (S3). The default includes a process for setting a storage region for the merged process table 96 in the memory 95 for example.

In case where it is determined in S3 that the default has not been set, the control section 7 sets the default of the card 93 via the card reader 91 (S4). Note that, it may be so arranged that: the user is inquired via the display section of the operation panel 6 about whether or not to set the default, and setting of the default is carried out when the user gives an instruction to carry out the setting of the default.

While, in case where it is determined in S3 that the default has been set, the control section 7 reads information stored in the merged process table 96 of the card 93 and stores the read information into the merged process table storage section 102 (S5).

After completing the process S4 or S5, the control section 7 determines whether or not the version information of the merged process table stored in the memory 95 of the card 93 (i.e., the version information of the common process table used in generating the merged process table) is identical to version information of the common process table stored in the server 50 (S6). Specifically, the control section 7 determines whether or not the version information included in the merged process table read out from the card 93 is identical to the version information of the common process table obtained from the server 50 and stored in the version information storage section 103.

Further, in case where the version information of the merged process table is not identical to the version information of the common process table, the control section 7 determines whether or not to update the merged process table stored in the card 93 (S7). This determination is given on the basis of an instruction inputted by the user. Further, in case where it is determined in S7 not to update the merged process table, the control section 7 ends the process.

While, in case where it is determined in S7 to update the merged process table, the control section 7 obtains the latest common process table from the server 50 (S8) and transmits the obtained common process table to the card 93 (S9).

The storage process section 94 of the card 93 controls the merged process rule generation section 97 so as to generate a merged process rule in accordance with the merged process table inputted from the digital color multi-function printer 1 (SC1). Further, the generated merged process rule, an ID of a reference image corresponding to the merged process rule, and version information of the common process table used in generating the merged process rule are registered into the merged process table 96 (SC2). Further, the storage process section 94 transmits the generated merged process table 96 to the digital color multi-function printer 1 (SC3).

The control section 7 of the digital color multi-function printer 1 reads the merged process table from the card 93 and updates the merged process table stored in the merged process table storage section 102 (S10).

In case where it is determined in S6 that the version of the merged process table stored in the merged process table storage section 102 is identical to the version of the common process table stored in the server 50, or after updating in S10 the merged process table stored in the merged process table storage section 102, the control section 7 obtains input image data and a user's request (inputted instruction) for processing the input image data (S11, S12). Note that, the input image data may be obtained by reading a document image with use of the color image input apparatus 2. Alternatively, input image data transmitted from an external device via the communication device 5 may be obtained, or input image data may be obtained by reading the input image data from each of various storage mediums. Further, the request for processing the input image data may be inputted via the operation panel 6 or may be inputted via the communication device 5.

Next, the control section 7 control the respective sections of the document matching process section 13 so as to carry out a feature point calculation process (S13) and a features calculation process (S14) with respect to the input image data obtained in S11.

Next, the control section 7 determines whether the process requested by the foregoing request is a storage process or not (S15). Further, the control section 7 carries out the storage process of FIG. 20 (S16) in case where the process is the storage process and carries out the similarity determination process (matching process) of FIG. 21 (S17) in case where the process is not the storage process.

Next, a flow of processes in case of carrying out the storage process is described as follows with reference to FIG. 20. In case where it is determined in S15 of FIG. 19 to carry out the storage process, the control section 7 transmits a document ID of the input image data obtained in S11 and features extracted from the input image data to the server 50 via the communication device 5 (S21).

Upon receiving the document ID and the features from the digital color multi-function printer 1 (SS21), the control section 52 of the server 50 registers the document ID and the features into the hash table 54 of the memory 53 with them corresponding to each other (SS22). Further, the control section 52 of the server 50 transmits a copy of the hash table 54 generated in SS22 to the digital color multi-function printer 1 (SS23).

Thereafter, the control section 7 of the digital color multi-function printer 1 obtains the updated hash table from the server 50 and updates the hash table stored in the hash table storage section 101 (S22).

Next, the control section 7 determines whether the process rule to be registered is the common process rule or the individual process rule (S23). Note that, it may be so arranged that: a user capable of carrying out the process for registering the common rule (administrator of the image processing system 100 for example) is registered in advance so that the common process rule can be registered only in case where the user is authenticated. Further, the process for registering the common rule can be carried out only by input means provided in the server 50 or a specific device connected to the server 50, and the registration of the common rule cannot be carried out from the terminal apparatus.

Further, in case where it is determined that the process is a process for registering the common process rule, the control section 7 obtains information concerning the content of the common process rule inputted by the user (S24) so as to transmit (i) a document ID of a reference image to which the common process rule is to be applied and (ii) the content of the common process rule via the communication device 5 to the server 50 (S25). Note that, the content of the common process rule may be inputted by the user via the operation panel 6 or may be inputted by the user with an external device via the communication device 5.

When the communication device 51 receives the document ID and the common process rule transmitted from the digital color multi-function printer 1 (SS24), the control section 52 of the server 50 stores the document ID and the common process rule into the common process table 55 with them corresponding to each other and updates the version information of the common process table (SS25). Further, the control section 52 of the server 50 transmits the updated common process table 55 and the version information thereof to the digital color multi-function printer 1 (SS26). Note that, it may be so arranged that: when the hash table 54 or the common process table 55 of the server 50 is updated, the control section 52 of the server 50 notifies a predetermined destination (e.g., a user having the card 93) of this. A manner in which the control section 53 carries out the foregoing notification is not particularly limited, and an e-mail can be used for example. As a result, it is rapidly notified to the user that the hash table 54 or the common process table 55 has been updated, thereby allowing the notified user to update the merged process table of the card 93 so as to correspond to the latest common process rule.

Upon obtaining the updated common process table 55 and version information thereof via the communication device 5 (S26), the control section 7 of the digital color multi-function printer 1 transmits the obtained common process table 55 and version information thereof to the card 93 (S27).

The storage process section 94 of the card 93 causes the merged process rule generation section 97 to generate the merged process rule in accordance with the common process table inputted from the digital color multi-function printer 1 (SC21) and stores, into the merged process table 96, the generated merged process rule and an ID of a reference image to which the merged process rule is to be applied (SC22). Further, at this time, the version information of the common process table used to generate the merged process table is stored into the merged process table (version information of the merged process table is updated). Further, the storage process section 94 of the card 93 transmits a copy of the updated merged process table to the digital color multi-function printer 1 (SC23).

Thereafter, the control section 7 of the digital color multi-function printer 1 obtains the updated merged process table from the card 93 so as to update the merged process table stored in the merged process table storage section 102 (S28) and ends the process. Note that, it may be so arranged that, after the process of S28, a process based on the merged process rule having been registered in the foregoing manner is carried out in response to the user's instruction or the like for example.

On the other hand, in case where it is determined in S23 that the process is a process for registering the individual process rule, the control section 7 obtains information concerning the content of the individual process rule inputted by the user (S29) and transmits, to the card 93, a document ID of a reference image to which the individual process rule is to be applied and the content of the individual process rule (S30).

Note that, the content of the individual process rule may be inputted by the user via the operation panel 6 or may be inputted by the user with use of an external device via the communication device 5. For example, it may be arranged so that the control section 7 causes a display section of the operation panel 6 or a display section of other apparatus communicably connected via the communication device 5 to display a list of selectable processes (e.g., filing, electronic distribution, and the like) and the user selects a desired process from the displayed processes. Further, it may be so arranged that: in case where filing is selected as the desired process, the user inputs a password of a desired folder, or a tree structure of folders which can be filed is displayed and the user selects a folder to be filed. Further, it may be so arranged that: in case of carrying out electronic distribution, the user inputs an address or the like of the destination, or a list of addresses having been registered in advance is displayed and the user selects a desired address from the displayed addresses.

Further, it may be so arranged that: in case where there is inputted the individual process rule for canceling prohibition or restriction of a process carried out with respect to an image corresponding to a reference image which prohibits or restricts the process for the image under the common process rule, the merged process rule is not updated in accordance with the individual process rule. Alternatively, it may be so arranged that: in case where there is inputted the individual process rule for canceling prohibition or restriction of a process carried out with respect to an image corresponding to a reference image which prohibits or restricts the process for the image under the common process rule, update of the individual process rule is permitted and it is notified to a predetermined destination (an administrator of the image processing system 100 for example) by an e-mail or the like that the individual process rule has been updated, or the display section of the operation panel 6, the display section of the server 50, or a display section or the like of other apparatus included in the image processing system 100 displays an image notifying that the individual process rule has been updated.

Further, it may be so arranged that: as to the process for updating the merged process table 96, executable content of update is set for each user. In this case, the content of update and identification information of the user permitting the content of update are stored with them corresponding to each other, and the user is authenticated when the card 93 is inserted or the individual process rule is inputted.

The storage process section 94 of the card 93 causes the merged process rule generation section 97 to generate a new merged process rule in accordance with the individual process rule inputted from the digital color multi-function printer 1 and the merged process table 96 stored in the memory 95 (SC24) and stores the generated merged process rule and an ID of a reference image to which the merged process rule is to be applied into the merged process table 96 with them corresponding to each other, so as to updates the merged process table 96 (SC25). Note that, it may be so arranged that: the digital color multi-function printer 1 transmits, to the card 93, a newly registered individual process rule, a latest common process table, and version information of the common process table. And a merged process table is generated in accordance with the newly registered individual process rule, and then the merged process table 96 stored in the memory 95, and the latest common process table, so as to update the version information. Further, the storage process section 94 of the card 93 transmits a copy of the updated merged process table to the digital color multi-function printer 1 (SC26).

Thereafter, the control section 7 of the digital color multi-function printer 1 obtains the updated merged process table and updates the merged process table stored in the merged process table storage section 102 (S28) and ends the process.

Next, with reference to FIG. 21, the following will explain a flow in case of carrying out the similarity determination process (matching process). In case where it is determined that the process requested in S15 of FIG. 19 is not the storage process (or in case where it is determined that the similarity determination process is requested), the control section 7 carries out the similarity determination process. In this case, the control section 7 causes the voting process section 33 to carry out a voting process in accordance with the features calculated by the features calculation section 32 in S14 (S31). Further, the control section 7 causes the similarity determination process section 34 to carry out the similarity determination process in accordance with a voting result of the voting process section 33 (S32).

Next, in accordance with the result of the similarity determination process, the control section 7 determines whether or not the input image data obtained in S11 is similar to any reference image registered in the hash table stored in the hash table storage section 101 (S33). Further, in case where it is determined that the input image data is similar to the reference image, it is determined whether or not to carry out the process based on the merged process table stored in the merged process table storage section 102 (S34). This determination is carried out in accordance with an instruction inputted by the user via the operation panel 6 or the communication device 5.

Further, in case where it is determined to carry out a process based on the merged process rule, a process rule corresponding to the reference image determined as being similar to the input image data in S33 is read out from the merged process table and the process based on the process rule is carried out (S35) and the process is ended.

While, in case where it is determined in S33 that the input image data is not similar to the reference image and in case where it is determined in S34 not to carry out the process based on the merged process rule, the control section 7 inquires the user about whether or not to input a process rule for the input image data and determines whether or not to input the process rule in response to the user's instruction (S36). For example, the control section 7 causes the display section of the operation panel 6 or a display section of an external device communicably connected via the communication device 5 to display an image for inquiring the user about whether or not to input a process rule for the input image data inputted in S11, so as to determines whether or not to input the process rule in response to the user's instruction.

Further, in case where it is determined not to input the process rule, the control section 7 does not carry out the process with respect to the input image data inputted in S11 (cancels the process) (S37) and ends the operation.

While, in case where it is determined in S36 to input the process rule, the control section 7 receives the process rule inputted from the operation panel 6 or an external device (S38).

Thereafter, the control section 7 determines whether or not to incorporate the process rule received in S38 into the merged process table 96 stored in the card 93, that is, whether or not to updates the process rule of the merged process table 96 (S39). Further, in case where it is determined not to update the process rule of the merged process table 96, the control section 7 carries out a process based on the process rule received in S38 (S40) and ends the operation.

While, in case where it is determined in S39 to update the process rule of the merged process table 96, the control section 7 transmits, to the card 93, an ID of the reference image determined as being similar to the input image data in S33 and the process rule received in S38 (S41).

The storage process section 94 of the card 93 causes the merged process rule generation section 97 to generate a merged process rule in accordance with the process rule inputted from the digital color multi-function printer 1 and the merged process table 96 stored in the memory 95 (SC31) and stores the generated merged process rule and an ID of a reference image to which the merged process rule is to be applied into the merged process table 96 with them corresponding to each other, so as to update the merged process table 96 (S32). Note that, it may be so arranged that: the digital color multi-function printer 1 transmits, to the card 93, a newly registered process rule, a latest common process table, and version information of the common process table, and a merged process table is generated in accordance with the newly registered process rule, the merged process table 96 stored in the memory 95, and the latest common process table, so as to update the version information. Further, the storage process section 94 of the card 93 transmits a copy of the updated merged process table to the digital color multi-function printer 1 (SC33).

The control section 7 of the digital color multi-function printer 1 reads the updated merged process table from the card 93 and updates the merged process table stored in the merged process table storage section 102 (S42). Further, a process based on the updated merged process table is carried out (S35) and the operation is ended.

As described above, in the image processing system 100 according to the present embodiment, the server 50 stores therein (i) the hash table 54 in which an ID of a reference image and features of the reference image are stored with them corresponding to each other and (ii) the common process table in which the ID of the reference image corresponds to a common rule applied, regardless of users, to the input image data determined as being similar to the reference image. Further, the card 93 stores therein the merged process table in which (a) the merged process rule obtained by merging the common process rule with an individual process rule which is indicative of a process applied to the input image data determined being similar to the reference image and which is set for each user or each group corresponds to (b) an ID of the reference image to which the merged process rule is to be applied. Further, when the input image data is inputted to the digital color multi-function printer 1, the document matching process section 13 carries out the similarity determination process for determining similarity between the input image data and the reference image, and in case where there is a reference image similar to the input image data, the input image data is processed in accordance with the merged process rule corresponding to the reference image.

In this manner, a reference image to which a common process is applied for each user or each group and the content of the process (individual process rule) for the reference image are registered in advance, so that the user does not have to input processes for the input image data similar to the reference image one by one, thereby reducing load of the user in setting a process to be carried out with respect to the input image data.

Note that, in view of reduction of the user's load in setting a process to be carried out with respect to the input image data, the common process rule and the individual process rule may be respectively managed. For example, it is possible to adopt the following arrangement: the server 50 stores therein (i) the common process table in which the common process rule corresponds to an ID of a reference image to which the common process rule is to be applied and (ii) the hash table in which the ID of the reference image to which the common process rule is to be applied corresponds to features of the reference image, and the card 93 stores therein (a) an individual process table in which the individual process rule corresponds to an ID of a reference image to which the individual process rule is to be applied and (b) a hash table in which the ID of the reference image to which the individual process rule is to be applied corresponds to features of the reference image.

However, according to the arrangement, the common process rule and the individual process rule are respectively managed, so that the similarity determination process for a reference image corresponding to the common process rule and the similarity determination process for a reference image corresponding to the individual process rule have to be respectively carried out, so that the processes are complicate. Further, in case where both the common process rule and the individual process rule are set for the same reference image, inappropriate processes may be carried out, i.e., two processes may be carried out in a duplicate manner.

In contrast, according to the above-mentioned arrangement, the hash table in which the ID of the referenced image to which the merged process rule is to be applied corresponds to the features of the reference image is stored in the server 50. Further, the merged process rule is generated by merging the common process rule with the individual process rule, and the input image data is processed in accordance with the merged process rule. Thus, the similarity determination process is carried out in accordance with a single hash table, and a process for the input image data is set in accordance with a single merged process table, so that it is possible to simplify the similarity determination process unlike the case of managing the common process rule and the individual process rule respectively. Further, it is possible to prevent occurrence of such problem that a process based on the common process rule and a process based on the individual process rule are carried out in a duplicate manner.

Further, the arrangement in which the common process rule and the individual process rule are respectively managed raises such problem that, in case where the common process rule is changed or updated, the individual process rule does not reflect the change or update. Thus, in case where the common process rule concerning prohibition or the like of copy is changed, the updated common process rule cannot be exclusively applied unless the cards 93 of all the users are collected and data thereof (individual process table or the like) are updated or a similar operation is carried out.

Thus, in the present embodiment, version information is added to the common process table 55 stored in the server 50 and version information is added to the merged process table 96 stored in the card 93, and the version information of the common process table and the version information of the merged process table are matched. Further, the version information of the common process table and the version information of the merged process table are not identical to each other, the process for the input image data is prohibited. As a result, it is possible to easily cause all the users to carry out a process exclusively based on the common process rule.

Note that, the present embodiment described the arrangement in which the image processing system 100 includes the server 50 and the digital color multi-function printer 1, but the present invention is not limited to this. For example, a function of the server 50 may be included in the digital color multi-function printer 1. That is, it may be so arranged that: the hash table 54 and the common process table 55 are provided in the digital color multi-function printer 1, and the control section 7 suitably refers to or revises these tables.

Further, in the present embodiment, the merged process rule generation section 97 is provided in the card 93, but the present invention is not limited to this. The merged process rule generation section may be included in the digital color multi-function printer 1. In this case, it may be so arranged that: for example, the merged process rule or the merged process table generated in the digital color multi-function printer 1 is sent to the card 93, and the storage process section 94 of the card 93 stores the merged process rule or the merged process table into the merged process table 96.

Further, in the present embodiment, version information of the merged process table and version information of the common process table are not identical to each other in S6 of FIG. 19, and the process for the input image data is canceled so as to end the operation in case where it is determined in S7 not to update the merged process table. However, the present invention is not limited to this, and it may be so arranged that: for example, in case where it is determined in S7 not to update the merged process table, the common process table is obtained from the server 50 and stored into the merged process table storage section 102, and a process based on the common process rule is carried out.

Further, the present embodiment mainly described the case of applying the present invention to the image processing system 100 including the server 50 and the digital color multi-function printer 1, but application of the present invention is not limited to this as described above. For example, the present invention is applicable to a monochrome multi-function printer instead of the digital color multi-function printer 1. Furthermore, in addition to the monochrome multi-function printer, the present invention is applicable to a single-function apparatus such as a printer (image forming apparatus), a copier (image forming apparatus), a facsimile (image transmitting apparatus), a scanner (image reading apparatus), a digital camera (image reading apparatus), and a computer (image processing apparatus).

The scanner includes a scanner platen, an optical scanning section, CCD (charge coupled device) etc. The scanner scans a document image on the scanner platen with use of the optical scanning section, thereby reading the document image and forming image data. The digital camera includes an image sensing lens, a CCD (image input device) etc. The digital camera senses a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution change process, and rotation on image data supplied from the image input device to obtain image data compressed into a predetermined format and sends the image data to the other end, or the facsimile receives image data from the other end, decompresses the image data, performs a rotation process, a resolution change process, and a halftone process on the image data in accordance with performance of an image output device, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

Figure 22:
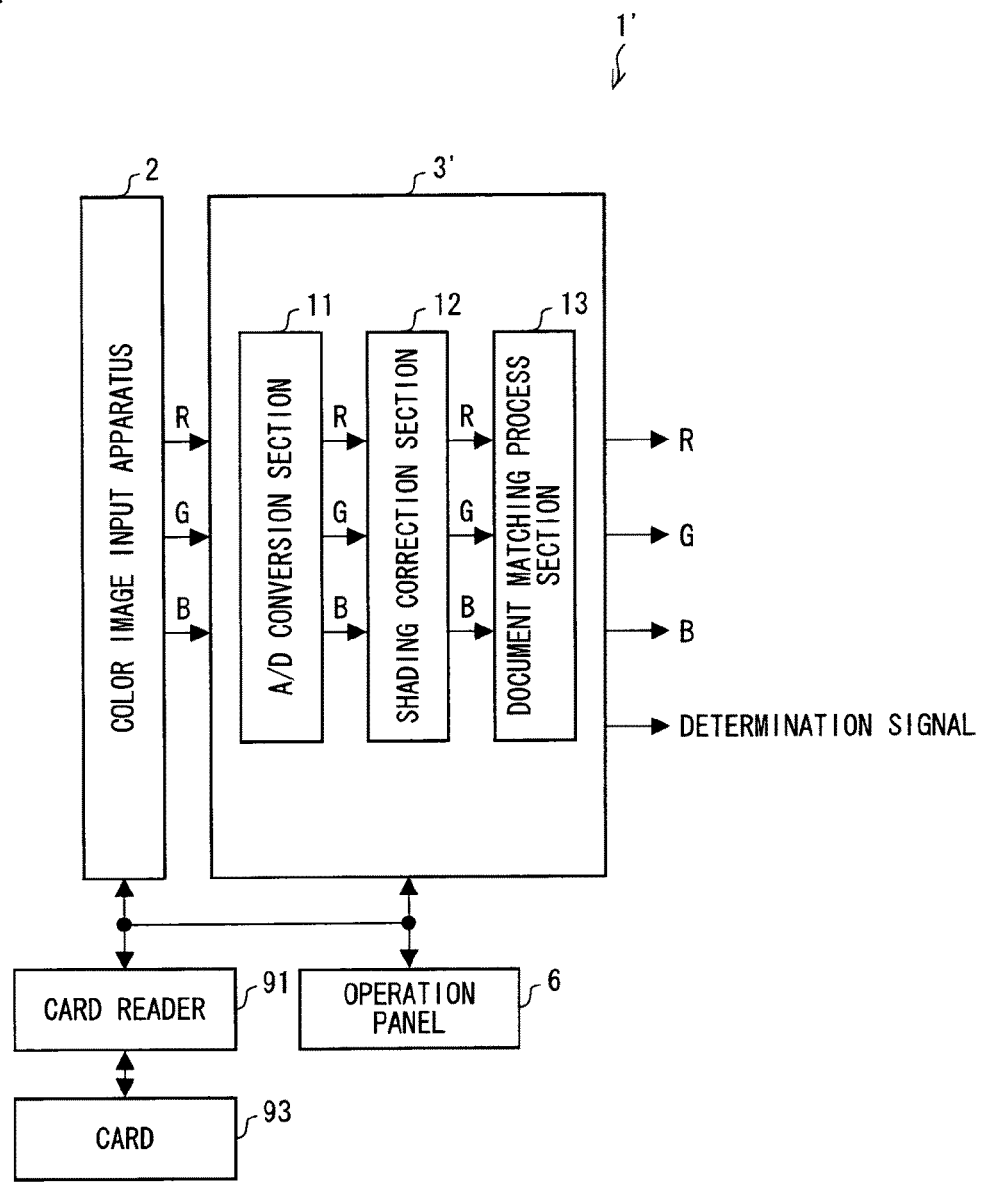
FIG. 22 is a block diagram illustrating a modification example of an image processing apparatus included in an image processing system in accordance with an embodiment of the present invention.

FIG. 22 is a block diagram illustrating an example of a structure of a flat bed scanner (image reading apparatus, image processing apparatus) 1' included in the image processing system 100 as in the digital color multi-function printer 1.

As illustrated in FIG. 22, the flat bed scanner 1' includes a color image input apparatus 2, a color image processing apparatus 3', an operation panel 6, and a card reader 91. The color image processing apparatus 3' includes an A/D conversion section 11, a shading correction section 12, and a document matching process section 13. The color image input apparatus 2 is connected to the color image processing apparatus 3', and the color image input apparatus 2 and the color image processing apparatus 3' constitute the image reading apparatus 1' as a whole. Functions of the A/D conversion section 11, the shading correction section 12, the document matching process section 13, and the card reader 91 are the same as those of the members in the digital color multi-function printer 1 as described above and explanations thereof are omitted here.

Further, as described above, the external storage device may be an external device such as a personal computer, a server, and the like, communicably connected to the digital color multi-function printer 1 via a network for example. In this case, it may be so arranged that the card reader 91 is omitted and information is transmitted between the digital color multi-function printer 1 and the external storage device via the communication device 5.

Further, in each of the embodiments, each of sections (each of blocks) which are provided on the digital color multi-function printer 1, the card (external storage device) 93, and the server 50 is realized by software using a processor such as a CPU or the like. That is, each of the digital color multi-function printer 1, the card 93, and the server 50 includes: a CPU (central processing unit) which executes a control program realizing the functions; a ROM (read only memory) in which the program is stored; a RAM (random access memory) which develops the program; a storage device (storage medium) such as a memory in which the program and various kinds of data are stored; and the like. Further, the object of the present invention can be achieved as follows: a storage medium for computer-readably storing a program code (an execute form program, intermediate code program, or source program) of the control program of each of the digital color multi-function printer 1, the card 93, and the server 50 which is software for implementing the aforementioned functions is provided to each of the digital color multi-function printer 1, the card 93, and the server 50, and a computer (or CPU and MPU) reads out the program code stored in the storage medium so as to implement the program, thereby achieving the object of the present invention.

Examples of the storage medium which satisfies these conditions include: tapes, such as magnetic tape and cassette tape; disks including magnetic disks, such as floppy disks (registered trademark) and hard disk, and optical disks, such as CD-ROMs, magnetic optical disks (MOs), mini disks (MDs), digital video disks (DVDs), and CD-Rs; cards, such as IC card (including memory cards) and optical cards; and semiconductor memories, such as mask ROMs, EPROMs, EEPROMs, and flash ROMs.

Further, it may be so arranged that: each of the digital color multi-function printer 1, the card 93, and the server 50 is made connectable to communication networks, and the program code is supplied via the communication networks. The communication networks are not limited to a specific means. Specific examples of the communication network include Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with IEEE1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with Bluetooth standard (registered trademark) or IEEE802.11 wireless standard, and (iii) a wireless line utilizing HDR, a mobile phone network, a satellite line, a ground wave digital network, and the like, as the transmission medium. Note that, the present invention can be realized by a computer data signal which is realized by electronic transmission of the program code and which is embedded in a carrier wave.

Further, each block of the digital color multi-function printer 1, the card 93, and the server 50 is not necessarily realized by software but may be realized by hardware logic. A combination of hardware for carrying out part of processing and operation means executing software for controlling the hardware and carrying out the rest of the processing may be used.

The image processing system (computer system) of the present invention may include: an image input device such as a flat bed scanner, a film scanner, and a digital camera; an image display device, such as a CRT display and a liquid crystal display, for displaying processing results of a computer in which a predetermined program code is loaded so as to carry out various processing such as the similarity calculation and the similarity determination; and an image forming apparatus, such as a printer, for outputting the processing results of the computer onto paper or the like. Further, the computer system may include a network card, a modem, and the like, each of which serves as communication means for allowing connection with a server or the like via a network.

As described above, an image processing apparatus of the present invention comprises: a features extracting section for extracting features of input image data; a reference features obtaining section for obtaining, from a communicably connected server or a reference storage section of the image processing apparatus, reference image information in which identification information of a reference image and features of the reference image correspond to each other; a similarity determination section for comparing the features of the input image data with the features of the reference image so as to determine whether the input image data is similar to the reference image or not; a control section for controlling a process for the input image data in accordance with a determination result given by the similarity determination section; and an external connection section for allowing information to be transmitted to and from an external storage device, said image processing apparatus further comprising a common process information obtaining section for obtaining, from the server or a common process information storage section of the image processing apparatus, (i) common process information in which a common process rule indicative of a process commonly applied to input image data determined as being similar to the reference image regardless of a user or attribute of the user corresponds to the identification information of the reference image and (ii) version information of the common process information, wherein the control section obtains, from the external storage device, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

According to the arrangement, the image processing apparatus obtains, from the server or the storage section (the reference storage section and the common process information storage section) of the image processing apparatus, (A) the reference image information in which identification information of a reference image and features of the reference image correspond to each other, (B) the common process information in which a common process rule indicative of a process commonly applied to input image data determined as being similar to the reference image regardless of a user or attribute of the user corresponds to the identification information of the reference image, and (C) the version information of the common process information. Further, the image processing apparatus obtains, from the external storage device, (1) the merged process information in which the identification information of the reference image corresponds to a merged process rule obtained by merging the common process rule with an individual process rule which is indicative of a process applied to the input image data determined as being similar to the reference image and which is set for each user or to attribute of the user and (2) the version information of the merged process information. Further, the control section of the image processing apparatus controls the process for the input image data so as to carry out the process based on the merged process rule corresponding to the reference image determined as being similar to the input image data by the similarity determination section only in case where the version information of the merged process information is identical to version information of the common process information or in case where the version information of the merged process information is latter than a predetermined version.

Thus, the process based on the merged process rule corresponding to the reference image determined as being similar to the input image data by the similarity determination section is carried out only in case where the version information of the merged process information is identical to version information of the common process information or in case where the version information of the merged process information is latter than a predetermined version, so that the user does not have to input processes for the input image data similar to the reference image one by one, thereby reducing load of the user in setting a process to be carried out with respect to the input image data. Further, it is possible to suppress occurrence of such problem that: a process for the input image data is more restricted than necessary in case where a less important change is made with respect to the common process rule or a similar case, so that the process cannot be carried out smoothly. Further, the process based on the merged process rule is not carried out in case where the version information of the merged process information is not identical to the version information of the common process information and the version information of the merged process information is former than the predetermined version information, so that it is possible to easily cause all the user using the image processing apparatus to carry out the process exclusively based on the common process rule whose version is latter than the predetermined version information.

Further, the image processing apparatus may be arranged so that the control section carries out the process based on the merged process rule corresponding to the reference image determined as being similar to the input image data by the similarity determination section is carried out only in the case where the version information of the merged process information is identical to the version information of the common process information.

According to the arrangement, the process based on the merged process rule corresponding to the reference image determined as being similar to the input image data by the similarity determination section is carried out in case where the version information of the merged process information is identical to the version information of the common process information, so that the user does not have to input the content of the process for the input image data one by one, thereby reducing load of the user in setting a process to be carried out with respect to the input image data. Further, the process based on the merged process rule is not carried out in case where the version information of the merged process information is not identical to the version information of the common process information, so that it is possible to easily cause all the user using the image processing apparatus to carry out the process exclusively based on the common process rule whose version is the latest.

Further, the image processing apparatus may be arranged so that the control section prohibits the process for the input image data in case where the version information of the merged process information is not identical to the version information of the common process information.

According to the arrangement, the process for the input image data is prohibited in case where the version information of the merged process information is not identical to the version information of the common process information, so that it is possible to more surely prevent a process which is not based on the common process rule from being carried out.

Further, the image processing apparatus may be arranged so that the common process information obtaining section obtains the common process information and the version information of the common process information from the common information storage section, and the control section updates the version information of the common process information in updating the common process information to be stored in the common process information storage section.

According to the arrangement, the version information of the common process information is updated in updating the common process information, so that the version information of the merged process information and the version information of the common process information can be compared with each other always based on the latest version information. Thus, it is possible to easily cause all the users using the image processing apparatus to carry out the process exclusively based on the common process rule whose version is the latest.

Further, the image processing apparatus may be arranged so as to comprise a merged process information generation section for generating the merged process information in accordance with the common process information and the individual process information in which the individual process rule corresponds to identification information of a reference image corresponding to the individual process rule, wherein the merged process information generation section generates the version information of the merged process information generated in accordance with the version information of the common process information used to generate the merged process information, and the control section transmits the merged process information and the version information of the merged process information to the external storage device.

According to the arrangement, it is possible to realize such condition that the merged process information is generated based on the common process information and the individual process information and the generated merged process information is stored in the external storage device.

Further, the image processing apparatus may be arranged so that: in case where the common process rule and the individual process rule are set with respect to a reference image and the common process rule prohibits or restricts a process for input image data, the merged process information generation section generates the merged process information so as to apply the common process rule to the input image data similar to the reference image.

According to the arrangement, the merged process information is generated so that the common process rule is preferentially applied in case where the common process rule prohibits or restricts the process for the input image data, so that it is possible to prevent the security for the input image data from decreasing.

Further, the image processing apparatus may be arranged so that: in case where the common process rule and the individual process rule are set with respect to a reference image and the common process rule does not prohibit or restrict a process to input image data, the merged process information generation section generates the merged process information so as to apply the individual process rule to the input image data similar to the reference image.

According to the arrangement, the individual process rule is applied to the input image data similar to the reference image in case where the common process rule does not prohibit or restrict the process for the input image data. Thus, by setting a detail individual process rule set for each user or each attribute of the user, it is possible to reduce load of the user in setting a process to be carried out with respect to the input image data.

An image forming apparatus of the present invention comprises any one of the aforementioned image processing apparatuses and an image output section for forming an image corresponding to the input image data onto a recording medium.

According to the image forming apparatus, the process based on the merged process rule corresponding to the reference image determined as being similar to the input image data by the similarity determination section is carried out only in case where the version information of the merged process information is identical to version information of the common process information or in case where the version information of the merged process information is latter than a predetermined version, so that the user does not have to input processes for the input image data similar to the reference image one by one, thereby reducing load of the user in setting a process to be carried out with respect to the input image data. Further, it is possible to suppress occurrence of such problem that: a process for the input image data is more restricted than necessary in case where a less important change is made with respect to the common process rule or a similar case, so that the process cannot be carried out smoothly. Further, the process based on the merged process rule is not carried out in case where the version information of the merged process information is not identical to the version information of the common process information and the version information of the merged process information is former than the predetermined version information, so that it is possible to easily cause all the user using the image processing apparatus to carry out the process exclusively based on the common process rule whose version is latter than the predetermined version information.

In order to solve the foregoing problems, an image processing method of the present invention, adopted in an image processing apparatus which carries out a similarity determination step in which features obtained from input image data are compared with features of a reference image having been stored in advance so as to determine whether the input image data is similar to the reference image or not and a process controlling step in which a process for the input image data is controlled in accordance with a determination result given in the similarity determination step, said image processing method comprising: a common process information storage step of storing, in the image processing apparatus or a server communicably connected to the image processing apparatus, (i) common process information in which a common process rule indicative of a process commonly applied to input image data determined as being similar to the reference image regardless of a user or attribute of the user corresponds to the identification information of the reference image and (ii) version information of the common process information; a merged process information storage step of storing, in the image processing apparatus or the server communicably connected to the image processing apparatus, (I) merged process information in which the identification information of the reference image corresponds to a merged process rule obtained by merging the common process rule to an individual process rule which is indicative of a process applied to the input image data determined as being similar to the reference image and which is set for each user or to attribute of the user and (II) version information of the merged process information; and a comparison step of comparing the version information of the merged process information with the version information of the common process information, wherein a process based on the merged process rule corresponding to the reference image determined as being similar to the input image data in the similarity determination step is carried out only in case where the version information of the merged process information is identical to version information of the common process information or in case where the version information of the merged process information is latter than a predetermined version.

In order to solve the foregoing problems, an image processing system of the present invention comprises: an image processing apparatus including an external connection section which allows information to be transmitted to and from an external storage device; and a server communicably connected to the image processing apparatus, the server including a reference features storage section for storing therein (i) common process information in which a common process rule indicative of a process commonly applied to input image data determined as being similar to the reference image regardless of a user or attribute of the user corresponds to the identification information of the reference image and (ii) version information of the common process information, wherein at least one of the image processing apparatus and the server includes: a features extracting section for extracting features of input image data; a similarity determination section for comparing the features of the input image data with the features of the reference image so as to determine whether the input image data is similar to the reference image or not; and a control section for controlling a process for the input image data in accordance with a determination result given by the similarity determination section, and the image processing apparatus obtains, from the external storage device, (I) merged process information in which the identification information of the reference image corresponds to a merged process rule obtained by merging the common process rule to an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

According to the image processing method and the image processing system, the process based on the merged process rule corresponding to the reference image determined as being similar to the input image data by the similarity determination section is carried out only in case where the version information of the merged process information is identical to version information of the common process information or in case where the version information of the merged process information is latter than a predetermined version, so that the user does not have to input the content of the process for the input image data similar to the reference image one by one, thereby reducing the load of the user concerning operation for setting the content of the process for the input image data. Further, it is possible to suppress occurrence of such problem that: a process for the input image data is more restricted than necessary in case where a less important change is made with respect to the common process rule or a similar case, so that the process cannot be carried out smoothly. Further, the process based on the merged process rule is not carried out in case where the version information of the merged process information is not identical to the version information of the common process information and the version information of the merged process information is former than the predetermined version information, so that it is possible to easily cause all the user using the image processing apparatus to carry out the process exclusively based on the common process rule whose version is the latest.

Note that, the image processing apparatus may be realized by a computer. In this case, the scope of the present invention includes also: an image processing program which causes a computer to operate as the respective sections so that the image processing apparatus is realized by the computer; and a computer-readable storage medium in which the image processing program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus, comprising: a features extracting section for extracting features of input image data; a reference features obtaining section for obtaining, from a communicably connected server or a reference storage section of the image processing apparatus, reference image information in which identification information of a reference image and features of the reference image correspond to each other; a similarity determination section for comparing the features of the input image data with the features of the reference image so as to determine whether the input image data is similar to the reference image or not; a control section for controlling a process for the input image data in accordance with a determination result given by the similarity determination section; and an external connection section for allowing information to be transmitted to and from an external storage device, said image processing apparatus further comprising a common process information obtaining section for obtaining, from the server or a common process information storage section of the image processing apparatus, (i) common process information in which a common process rule indicative of a process commonly applied to input image data determined as being similar to the reference image regardless of a user or attribute of the user corresponds to the identification information of the reference image and (ii) version information of the common process information, wherein the control section obtains, from the external storage device, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

2. The image processing apparatus as set forth in claim 1, wherein the control section carries out the process based on the merged process rule corresponding to the reference image determined as being similar to the input image data by the similarity determination section is carried out only in the case where the version information of the merged process information is identical to the version information of the common process information.

3. The image processing apparatus as set forth in claim 2, wherein the control section prohibits the process for the input image data in case where the version information of the merged process information is not identical to the version information of the common process information.

4. The image processing apparatus as set forth in claim 1, wherein the common process information obtaining section obtains the common process information and the version information of the common process information from the common information storage section, and the control section updates the version information of the common process information in updating the common process information to be stored in the common process information storage section.

5. The image processing apparatus as set forth in claim 1, comprising a merged process information generation section for generating the merged process information in accordance with the common process information and the individual process information in which the individual process rule corresponds to identification information of a reference image corresponding to the individual process rule, wherein the merged process information generation section generates the version information of the merged process information generated in accordance with the version information of the common process information used to generate the merged process information, and the control section transmits the merged process information and the version information of the merged process information to the external storage device.

6. The image processing apparatus as set forth in claim 5, wherein:

in case where the common process rule and the individual process rule are set with respect to a reference image and the common process rule prohibits or restricts a process for input image data, the merged process information generation section generates the merged process information so as to apply the common process rule to the input image data similar to the reference image.

7. The image processing apparatus as set forth in claim 5, wherein:

in case where the common process rule and the individual process rule are set with respect to a reference image and the common process rule does not prohibit or restrict a process to input image data, the merged process information generation section generates the merged process information so as to apply the individual process rule to the input image data similar to the reference image.

8. An image forming apparatus, including an image processing apparatus and an image outputting apparatus for forming an image corresponding to input image data onto a recording medium, said image processing apparatus, comprising:

a features extracting section for extracting features of input image data;

a reference features obtaining section for obtaining, from a communicably connected server or a reference storage section of the image processing apparatus, reference image information in which identification information of a reference image and features of the reference image correspond to each other;

a similarity determination section for comparing the features of the input image data with the features of the reference image so as to determine whether the input image data is similar to the reference image or not;

a control section for controlling a process for the input image data in accordance with a determination result given by the similarity determination section; and an external connection section for allowing information to be transmitted to and from an external storage device, said image processing apparatus further comprising a common process information obtaining section for obtaining, from the server or a common process information storage section of the image processing apparatus, (i) common process information in which a common process rule indicative of a process commonly applied to input image data determined as being similar to the reference image regardless of a user or attribute of the user corresponds to the identification information of the reference image and (ii) version information of the common process information, wherein the control section obtains, from the external storage device, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

9. An image processing method, adopted in an image processing apparatus which carries out a similarity determination step in which features obtained from input image data are compared with features of a reference image having been stored in advance so as to determine whether the input image data is similar to the reference image or not and a process controlling step in which a process for the input image data is controlled in accordance with a determination result given in the similarity determination step, said image processing method comprising:

a common process information storage step of storing, in the image processing apparatus or a server communicably connected to the image processing apparatus, (i) common process information in which a common process rule indicative of a process commonly applied to input image data determined as being similar to the reference image regardless of a user or attribute of the user corresponds to the identification information of the reference image and (ii) version information of the common process information;

a merged process information storage step of storing, in the image processing apparatus or the server communicably connected to the image processing apparatus, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information; and a comparison step of comparing the version information of the merged process information with the version information of the common process information, wherein a process based on the merged process rule corresponding to the reference image determined as being similar to the input image data in the similarity determination step is carried out only in case where the version information of the merged process information is identical to version information of the common process information or in case where the version information of the merged process information is latter than a predetermined version.

10. An image processing system, comprising: an image processing apparatus including an external connection section which allows information to be transmitted to and from an external storage device; and a server communicably connected to the image processing apparatus, the server including a reference features storage section for storing therein (i) common process information in which a common process rule indicative of a process commonly applied to input image data determined as being similar to the reference image regardless of a user or attribute of the user corresponds to the identification information of the reference image and (ii) version information of the common process information, wherein at least one of the image processing apparatus and the server includes: a features extracting section for extracting features of input image data; a similarity determination section for comparing the features of the input image data with the features of the reference image so as to determine whether the input image data is similar to the reference image or not; and a control section for controlling a process for the input image data in accordance with a determination result given by the similarity determination section, and the image processing apparatus obtains, from the external storage device, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

11. A non-transitory computer-readable storage medium, storing therein a program for operating an image processing apparatus, said program causes a computer to operate as respective sections of an image processing apparatus including:

a features extracting section for extracting features of input image data;

a reference features obtaining section for obtaining, from a communicably connected server or a reference storage section of the image processing apparatus, reference image information in which identification information of a reference image and features of the reference image correspond to each other;

a similarity determination section for comparing the features of the input image data with the features of the reference image so as to determine whether the input image data is similar to the reference image or not;

a control section for controlling a process for the input image data in accordance with a determination result given by the similarity determination section;

an external connection section for allowing information to be transmitted to and from an external storage device; and a common process information obtaining section for obtaining, from the server or a common process information storage section of the image processing apparatus, (i) common process information in which a common process rule indicative of a process commonly applied to input image data determined as being similar to the reference image regardless of a user or attribute of the user corresponds to the identification information of the reference image and (ii) version information of the common process information, wherein the control section obtains, from the external storage device, (I) merged process information in which the identification information of the reference image corresponds to a merged process rule obtained by merging the common process rule with an individual process rule which is indicative of a process applied to the input image data determined as being similar to the reference image and which is set for each user or to attribute of the user and (II) version information of the merged process information, and a process based on the merged process rule corresponding to the reference image determined as being similar to the input image data by the similarity determination section is carried out only in case where the version information of the merged process information is identical to version information of the common process information or in case where the version information of the merged process information is latter than a predetermined version.

* * * * *